(12) United States Patent
Westort et al.

(10) Patent No.: US 6,612,701 B2
(45) Date of Patent: Sep. 2, 2003

(54) IMAGE ENHANCEMENT IN A REAL IMAGE PROJECTION SYSTEM, USING ON-AXIS REFLECTORS, AT LEAST ONE OF WHICH IS ASPHERIC IN SHAPE

(75) Inventors: Kenneth S. Westort, Ithaca, NY (US); Douglas L. Robinson, Ithaca, NY (US); Randolph J. Turner, Ithaca, NY (US)

(73) Assignee: Optical Products Development Corporation, Elmira, NY (US)

( * ) Notice: Subject to any disclaimer, the term of this patent is extended or adjusted under 35 U.S.C. 154(b) by 53 days.

(21) Appl. No.: 09/933,331

(22) Filed: Aug. 20, 2001

(65) Prior Publication Data

US 2003/0035085 A1 Feb. 20, 2003

(51) Int. Cl.⁷ .............................................. G03B 21/14
(52) U.S. Cl. ......................... 353/10; 353/78; 359/479; 359/629
(58) Field of Search ................................ 353/10, 98, 99, 353/74, 77, 78, 28; 359/630, 631, 633, 478, 479, 629

(56) References Cited

U.S. PATENT DOCUMENTS

| | | | |
|---|---|---|---|
| 3,647,284 A | 3/1972 | Elings et al. ............... 350/294 |
| 4,802,750 A | 2/1989 | Welck ......................... 350/619 |
| 5,311,357 A | * 5/1994 | Summer et al. ............ 359/479 |
| 5,687,025 A | * 11/1997 | Nanba ......................... 359/633 |
| 5,782,547 A | * 7/1998 | Machtig et al. ............... 353/28 |
| 5,886,818 A | 3/1999 | Summer et al. ............ 359/478 |
| 6,315,416 B1 | * 11/2001 | Dominguez-Montes et al. ............................ 353/99 |
| 6,421,182 B1 | * 7/2002 | Holden ....................... 359/629 |

* cited by examiner

Primary Examiner—William Dowling
(74) Attorney, Agent, or Firm—Brown & Michaels, PC

(57) ABSTRACT

A real image projection system comprising two or more optical surfaces of revolution, with at least one comprising an aspheric surface of revolution. The aspheric surface of revolution is of a design to reduce natural aberrations inherent in imaging using surface of revolutions of the conic family of curves. In one embodiment, a real image projection system includes a pair of curved reflector segments of the conical family of curves, wherein at least one of the reflector segments has an aspherical surface of revolution, the primary segment being of longer focal length relative to the secondary segment, and an object positioned substantially at the focal point of the longer focal length reflector segment, such that a real image is positioned substantially at the focal point of the shorter focal length reflector segment, and the real image is projected along a viewing axis extending from the object positioned at the focal point of the primary reflector segment to the surface of the primary reflector segment, to the surface of the secondary reflector segment, to the focal point of the secondary reflector segment, to a viewer.

59 Claims, 25 Drawing Sheets

IMAGE ENHANCEMENT IN A REAL IMAGE PROJECTION SYSTEM, USING ON-AXIS REFLECTORS, AT LEAST ONE OF WHICH IS ASPHERIC IN SHAPE

BACKGROUND OF THE INVENTION

1. Field of the Invention

The invention pertains to the field of optical display systems. More particularly, the invention pertains to apparatus and methods for enhancement of a real image projection system through the use of one or more aspheric mirrors or corrective aspheric optical curvatures.

2. Description of Related Art

The invention pertains to a real image projection system, and in particular, to a system in which an image of a real object is formed in space, giving the illusion that a real object exists at that point in space, when in reality it does not. A variation of this type of system has existed for many years in the form of various toys and magic tricks. Most are in the form of dual facing parabolic mirrors of equal focal lengths, known as 360 (i.e., 360°) displays, which create the illusion that a real object exists at the vertex of the upper curved mirror, but in which the real target object is actually located within the device itself, at the vertex of the lower curved mirror. Thus, the device creates the illusion of an object floating above the unit, when actually the object is positioned within the device at a different location.

U.S. Pat. No. 5,886,818, to Summer et al. (1999), the complete disclosure of which is hereby incorporated herein by reference, discloses a real image projection system having some features in common with the present invention.

U.S. Patent No. 3,647,284, to Elings (1972), the complete disclosure of which is hereby incorporated herein by reference, referred to hereinafter as the Elings patent, specifies parabolic, spherical, or ellipsoidal mirrors. The existing state of technology in 1972 would have made aspheric mirrors an impractical consideration. Thus, the device described in the Elings patent could have only functioned acceptably using two parabolic mirrors. Today's manufacturing technology, however, allows the production of aspheric optics in volume, and together with currently available desktop lens design software, makes the design and production of such complex optics possible. Parabolas are excellent for imaging at the focal point, but as one attempts to image larger objects where portions of the object are located substantially offset from the focal point, the effects of optical aberrations seriously degrade image quality. The aberrations and image degradation created by two spheres would have made the image nearly unrecognizable as the object being imaged. Ellipses have even more significant imaging problems. The parabola was the optimum solution in 1972, since production of aspheric optics of any size was not a practical option or something that one skilled in the art would even consider designing or building. Recent technological advances in lens manufacturing now make aspheric reflectors a practical solution to a difficult imaging problem.

An asphere is an optimized curve, significantly deviating from the other conic family of curves, such as spheres, parabolas, hyperbolas, and ellipses. Aspheres have very non-uniform curve changes that are specifically designed to counteract and minimize the aberrations that are natural phenomena of other curve families, especially for imaging off-axis or offset from the focal point.

U.S. Pat. No. 4,802,750, to Welck (1989), the complete disclosure of which is hereby incorporated herein by reference, referred to hereinafter as the Welck patent, discloses two facing parabolic segments of equal focal length, each being positioned such that its vertex is coincident with the focal point of the other. The light-path is transmitted from the focal point of the first parabolic mirror segment and is reflected off of the first parabolic reflector surface as collimated light (i.e., the reflected rays emanating from any one point source are substantially parallel to all other reflected rays emanating from the same source point, regardless of where on the curved surface it reflects from) as it is reflected to the second facing parabolic mirror, forming an image at the focal point of the second parabolic mirror. Maintaining a collimated or parallel light path between the two reflector surfaces is important to minimize the effects of aberrations, which is a natural phenomenon of curved optics, such as parabolic mirrors. The present invention differs substantially, in that the system of the Welck patent is limited to equal focal length parabolic segments, and is defined as an off-axis system. The Welck patent differs from the Elings patent, in that it uses "compound curvilinear surfaces of revolution". Although the mirrors disclosed in the Welck patent are defined as having a "compound curvilinear" surface of revolution, the Welck patent is clearly limited to parabolic surfaces.

In a conventional configuration, such as the Welck patent, using two parabolic mirrors of equal focal lengths, the light-path between the two parabolic reflectors is collimated when the image is projected at a "one-to-one" unmagnified condition. To create a de-magnified image using this configuration, the actual target object must be moved to a position other than the focal point. The result of de-magnifying with this method is that the light-path between the two parabolic mirrors is no longer collimated or parallel, and the effects of aberrations become more apparent, thus causing degradation of the projected image. As the image moves away from the focal point, the image quality degrades substantially. This is a natural and inherent problem with parabolic systems used off-axis, or when imaging at a point other than the focal point of the optical elements. An aspheric curve can be optimized to counteract and minimize such aberrations.

There are significant advantages to projecting a de-magnified image with improved imagery. A de-magnified image has a higher resolution per square inch. As an example, a standard 5" LCD panel measuring 3" high by 4" wide, with 640 by 480 resolution has a resolution of 160 pixels per inch in both the horizontal and vertical direction, or 25,600 pixels per square inch. A real image projected by the present invention, using two unequal focal length mirror segments (e.g., one at 80% of the other, or an 80% de-magnification), at least one of which is aspheric in shape, results in a real image pixel density of 200 pixels per inch in both horizontal and vertical direction, thus resulting in an image pixel density of 40,000 pixels per square inch. Thus, the resulting resolution of the image is 156% of the resolution of the actual target LCD screen. The density of a real image relates directly to how solid and, thus, how real the image appears to the eye. This is of significance in preventing image "bleed-through" of the background scene or image.

A second benefit of the present invention is that it increases the brightness per square inch of the projected real image, as compared to the actual target object, with significantly less image degradation. As an example, the system using a LCD panel that produces 200 lumens per square inch produces an image that provides 230 lumens per square inch (assuming that the two reflectors each have a reflectivity of 96% and the system has two different focal lengths, one being 80% of the other). In contrast, prior art systems, such as those described in the Elings and Welck patents, produce a real image having a brightness of only 184 lumens per square inch (assuming that the mirrors also have 96% reflective coatings and the systems are used in a 1× magnification or equal focal lengths reflectors, as they are described).

An additional benefit of the present invention is that the optical orientation of the two aspheric mirrors optionally can be reversed, so that the axis of the longer focal length segment is parallel to the viewing axis, thus producing a magnified image at an increased projection distance. The two different focal length mirrors optionally are combined in four different orientations. For example, in a system using a 10" focal length mirror and a 12" focal length mirror, four separate effects can be achieved through varying the combination of focal lengths. Two 10" mirrors would produce a 1× full size image with increased field of view. Two 12" mirrors would produce a 1× full size image with greater projection distance. A 12" primary mirror and 10" secondary mirror would produce a de-magnified image, and a 10" primary mirror and 12" secondary mirror would produce a magnified image.

The most important advantage of an asphere over a parabola is that the optic is no longer limited by the 2.828 ratio of diameter to focal length. In a parabola, light emanating from the focal point will always reflect in a collimated beam, or parallel off the surface of the parabola up to a physical distance limit of (2.828"/2*f) from the vertex. For a 10" focal length parabolic mirror, the maximum diameter that would reflect collimated light is a 28.28" diameter optic. Light striking the parabolic surface outside of this physical diameter is not reflected in a collimated beam. Therefore, a parabola with a focal length of ten inches (10") is limited to a diameter of 28.28" or 2.828 times 10". A parabola with a diameter larger than 2.828 times the focal length will form a distorted image. An aspheric curve is not limited by the 2.828 times the focal length factor. An asphere can be designed with a 10" focal length that is larger than 28.28" in diameter, and which will maintain a collimated reflected beam across the entire surface. If the aspheric curve is formed as a holographic mirror, the advantages of larger aspheric optics become apparent, especially for the "360" configuration.

In studying the ray-tracings of the various curves, it becomes apparent that using aspheric optics can significantly improve image quality, when the system is used in an off-axis arrangement. Thus, the configuration shown in the Welck patent, for example, could be substantially improved, by substituting the aspheric mirror of the present invention for one or both of the parabolic mirror segments described in the Welck patent. This same advantage or improvement also can be applied to the configuration shown in the Elings patent, thus providing a greatly improved image in the 360° device described therein.

SUMMARY OF THE INVENTION

Briefly stated, a real image projection system includes at least two optical surfaces of the conical family of curves, wherein at least one of said optical curves comprises an aspherical surface of revolution. The system optionally includes a combination of any focal length curvatures, optionally comprising two curved optics or one curved optic comprising two optical surfaces of revolution, one on the convex and one on the concave side, one of which surfaces of revolution is an asphere.

In an embodiment of the invention, a real image projection system includes a pair of curved reflector segments of the conical family of curves, wherein at least one of the reflector segments has an aspherical surface of revolution, the primary segment being of longer focal length relative to the secondary segment, and an object positioned substantially at the focal point of the longer focal length reflector segment, such that a real image is positioned substantially at the focal point of the shorter focal length reflector segment, and the real image is projected along a viewing axis extending from the object positioned at the focal point of the primary reflector segment to the surface of the primary reflector segment, to the surface of the secondary reflector segment, to the focal point of the secondary reflector segment, to a viewer.

In a second embodiment of the invention, one optical element consists of two separate curves, one aspheric curve on the concave side of the optic, and one curve of the standard conic curve family on the convex side of the optic. A parabolic, spherical, or other standard conic curvature is provided on the convex surface, which has a mirrored coating applied, and the concave surface has an aspheric curvature and an anti-reflective coating, which functions as a corrective lens to reduce spherical aberration and other naturally occurring optical aberrations.

DETAILED DESCRIPTION OF THE INVENTION

Figure 1:
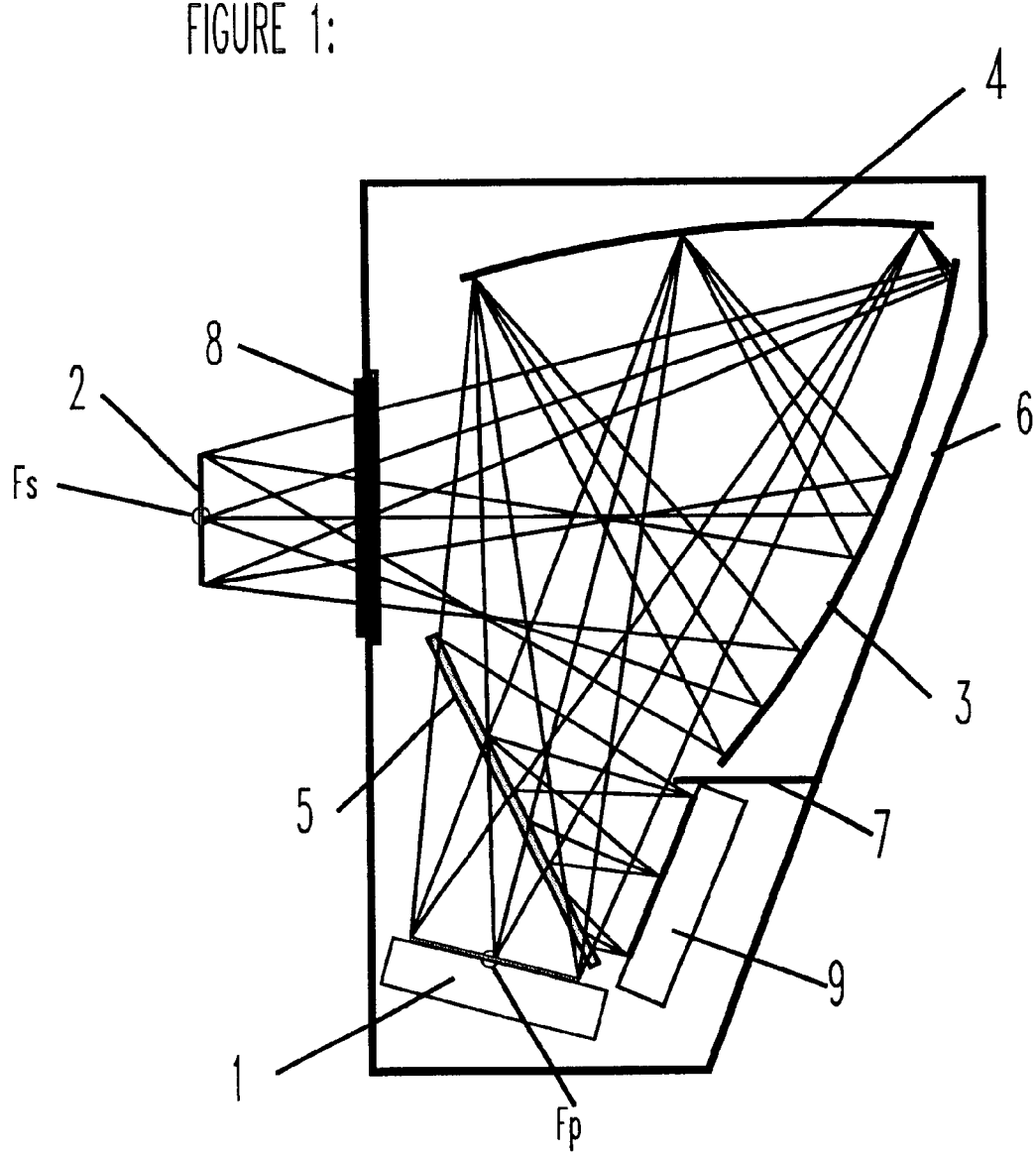
FIG. 1 is a side view of a preferred embodiment of the present invention, showing a pair of facing, on-axis, reflective mirrors mounted in a supporting frame.

The following definitions are to be used throughout the specification and claims, unless otherwise specifically stated:

Asphere—a curve of conical baseline, such as spherical, parabolic, hyperbolic, or elliptical, and which includes an aspheric surface of revolution. Aspheric curves provide combinations of higher order terms in the curve formulas to create surfaces of revolution that, in combination, produce imagery with reduced aberrations. The deviation from a real conic section, in effect, allows extra degrees of design-freedom, which can be used by the optical designer to improve imagery in real or virtual imaging systems. Each of these standard conic curves has significant shortcomings, when used in a particular configuration, such as that of the invention described herein. An aspherical curve deviation allows the system optics to be optimized to perform much better off-axis or when the object location deviates from the focal point. Every optical system has inherent errors and aberrations as a function of natural physics, and slight curve deviations possible in an asphere will compensate for these phenomena. In all of the claims herein, the term "aspheric" shall refer to a curve of conical baseline, such as spherical, parabolic, hyperbolic, or elliptical, and which includes an aspheric surface of revolution in at least one of the reflectors of the system.

Field-Of-View—the angle at which a full real image can be viewed.

Lens Element—refers to a lens, lens system, or any optical arrangement that will modify the focal point of an image. The term is used generally to describe a supplemental optical element to the primary optical system, which, in the present invention, comprises primarily two aspheric reflector segments, as described herein.

On-Axis—the orientation of optics to each other, wherein the focal points of each parent optic and the vertex or optical center of each parent optic are all on a common axis or imaginary straight line.

Optical Aberration—a natural optical phenomenon found in all optics. The inability of lenses and mirrors to form a perfect image is due to naturally occurring phenomena called optical aberrations. It is the optical designer's task to minimize the inherent optical aberrations found within an optical system, to an acceptable level. This may be accomplished by the use of various lenses, mirrors, optical surface shapes and materials to balance and cancel defects in the image. An asphere design is a method of minimizing aberrations by optimizing optical surface shape. Common aberrations are astigmatism, chromatic aberration, coma, field curvature, distortion and spherical aberration. Aberrations affecting image quality increase as the imaging location is moved away from the focal point and optical axis of an optic. This phenomena can be minimized by maintaining the image and target object substantially at the focal point of a parabola or asphere.

Reflector—a reflective optic, referring to a substrate having a mirror coating or partially reflective coating, such as, but not limited to, a semi-transparent beamsplitter coated optic. This coating may be either a rear or front surface coating, depending generally on the surface of the substrate that is used to reflect.

Parent Optic—the full parabola, conic, or asphere from which a segment is cut or otherwise derived.

Segment—the term segment refers to a smaller optic cut from its parent optic and located between the optical center and the edge of the parent optic.

Object—the actual object or the light source from which a real image is formed. An object (or target object) is defined as any image source that reflects, emits, or transmits light, and includes, but is not limited to, such things as real objects, video or computer monitors, or projection devices, screens and the like.

Vertex—a point on the reflective surface of the parent optic that is coincident with the optical center of the parent parabola or asphere. The vertex of a segment is defined as the point on the reflective surface coincident with the optical center of the parent optic from which the segment is cut or otherwise derived.

Aspheric Curve Calculations

To calculate an aspherical curve, the following formulas are required:

Shown below, the formula for conic surfaces of revolution is used as a base-curve in an embodiment of the present invention. Also shown are formulas for calculating and designing an aspheric surface of revolution of the present invention.

The following is the formula for a conic surface of revolution. The locus of a point "P", shown in FIG. 25, which moves so that its distance (y) from a fixed point "f" (focus) bears a constant ratio "e" (eccentricity) to its distance from a fixed straight line (directrix) is a conic.

$$y^2 + x^2 = e^2(d+x)^2 \; r = de/1 - e\cos\theta$$

If (e=1) the "curve=parabola"

If (e>1) then "curve=hyperbola"

If (e<1) then "curve =ellipse"

The following is the formula for an aspheric surface of revolution. An aspheric surface of rotation is represented by an equation of the form:

$$x = f(y,z) = (cs^2/[1+1-c^2s^2]) + A_2 s^2 + A_4 s^4 + \ldots A_i s^i$$

where "x" is the longitudinal coordinate (abscissa) of a point on the surface which is the distance "s" from the "x-axis". The distance "x" is related to the coordinates "y" and "z" by:

$$s^2 = y^2 + x^2$$

The subsequent terms represent deformations to the spherical surface with "$A_2$", "$A_4$", etc., as the constants of the second, fourth, etc . . . , power deformation terms. The "x"coordinate of a point on the surface is the sum of the "x" coordinate of the reference sphere and the sum of all the deformation terms.

Referring now to FIG. 1, an example of an unequal focal length embodiment of the present invention is shown. The target object (1) in the example is a 5" LCD panel, however, the target object optionally is any object that either emits, transmits of reflects light. The image-generating surface of the LCD (1) is positioned on a plane at the focal point (Fp) of the upper reflector (4). The light from the image is emitted from the LCD panel (1) and strikes the parabolic or aspheric reflector (4), which has the longer focal length of the two reflectors, (4) and (3). In the example shown, the focal length of the primary reflector (4) is 15", and the focal length of the secondary reflector (3) is 12". At least one of the reflector segments is aspherical in curve of revolution, and preferably, both are aspherical. Light from the LCD (1), emanating from the focal point (Fp) of the primary reflector (4), reflects off of the surface of the primary reflector (4) in a collimated beam, meaning that the light rays reflected are substantially parallel to each other as they are reflected from the primary reflector (4) to the secondary reflector (3). The two reflectors (3,4) have different focal lengths. The collimated light beam strikes the secondary reflector (3) in a collimated beam configuration and forms a real image (2) of the target object (1) at the focal point (Fs) of the secondary reflector (3). Since both the target object (1) and real image (2) are positioned at the focal points (Fp and Fs, respectively) the image displays minimal effects of optical aberrations, since the light rays reflected between the two reflectors (4, 3) remain collimated.

To help understand the importance of maintaining a collimated beam between the two reflectors, the following explanation is offered. An aspheric reflector performs the same basic function as a parabolic reflector, except that it minimizes aberrations. However, for descriptive purposes, the following explanation shall be for parabolic reflectors. Parabolic reflectors are designed to capture light from the focal point of the reflector and reflect it in a collimated or parallel beam. Parabolic mirrors also collect parallel beams of light and brings them to focus at the focal point of the reflector. Light beams that are not collimated or parallel will not come to focus at a common point at the focal point of the reflector. The effect of optical aberrations is increased as the reflected light rays deviate from a collimated condition. Light rays from a common point on the surface of the LCD screen (1) radiate, striking all points of the surface of the reflector (3), and, as each light ray emanating from the same point on the LCD (1) reflects off of the parabolic reflector, it is collimated or parallel to all the other light rays emanating from the same position on the LCD panel (1), as long as the target object (1) is on a common plane with the focal point (Fs) of the reflector (4).

In the example shown in FIG. 1, the target object (1) is a 5" LCD monitor with a screen size of 4" wide by 3" high, having a resolution of 640 by 480 pixels. The LCD panel (1) is positioned on a plane common with the focal point (Fp) of the primary reflector (4) at a distance of 15" for the example using a 15" focal length primary reflector (4). The light beam from the LCD (1) strikes the primary reflector (4) and, since it emanates from a plane common to the focal point (Fp) of the primary reflector (4), it is reflected from the primary reflector, such that all light emanating from a point on the LCD screen is reflected in a collimated beam, meaning that all light rays emanating from a common point on the target (1) are reflected in a parallel path from the primary reflector (4). The collimated beam strikes the secondary reflector (3), and, because the beam is collimated, the secondary reflector (3) directs all the light rays emanating from a common point on the target (1) to a common point of intersection on a plane with the focal point (Fs) of the secondary reflector (3). In the example shown, the focal length of the secondary reflector (3) is 12", as compared to a 15" focal length for the primary reflector (4). The image of the target LCD screen (1) is formed at a plane common with the focal point (Fs) of the secondary reflector (3). In the example shown, the magnification of the real image (2) as compared to the target (1) is calculated by "Fs/Fp"or the ratio of the focal lengths of secondary reflector to the primary reflector, which, in the example, is ($^{12}/_{15}$) or 80% de-magnification.

Real image (2) would have the same number of pixels as the target LCD (1), except for the fact that the size of the real image (2) is 80% of the target object (1) in the example. The LCD width of 4" is thus projected as a real image of the monitor having a width of 3.2" or 80% of 4". The vertical height of the real image (2) is 2.4", as compared to the 3" height of the LCD (1). The resolution per linear inch of the real image (2) is 200 pixels per inch, as compared to 160 pixels per inch for the LCD (1). This results in a pixel density of 40,000 pixels (200×200) per square inch for the real image (2), as compared to 25,600 pixels (160×160) per square inch for the LCD target (1), thus increasing the resolution density of the real image (2) to that of 156% (200/160) of the LCD (1). Just as viewing the difference between a low-resolution newspaper photo and a high-resolution magazine photo, the denser the image, the more solid and real the image appears. This becomes extremely important when overlaying the real image over a background screen (e.g., FIG. 2) or in situations where the external lighting may "wash out" the image.

The same advantage applies when calculating image brightness. Just as a flashlight projected through a magnifying glass appears to increase the brightness, the same principle applies to the proposed real image device. The lumens or brightness is projected over a smaller area and therefore the lumens per square inch of the real image are greater than the target LCD (1) lumens per square inch.

FIG. 1 also shows an optional fold mirror (5) in the primary reflector (4) optical path to allow the target object (9) to be positioned in a different location, such as, for example, when the footprint of the system requires a compact configuration. The preferred baseline conical curve is a parabola, and at least one of the segments must be aspheric, to allow the system to be optimized for reduced aberrations and improved imagery.

Figure 2:
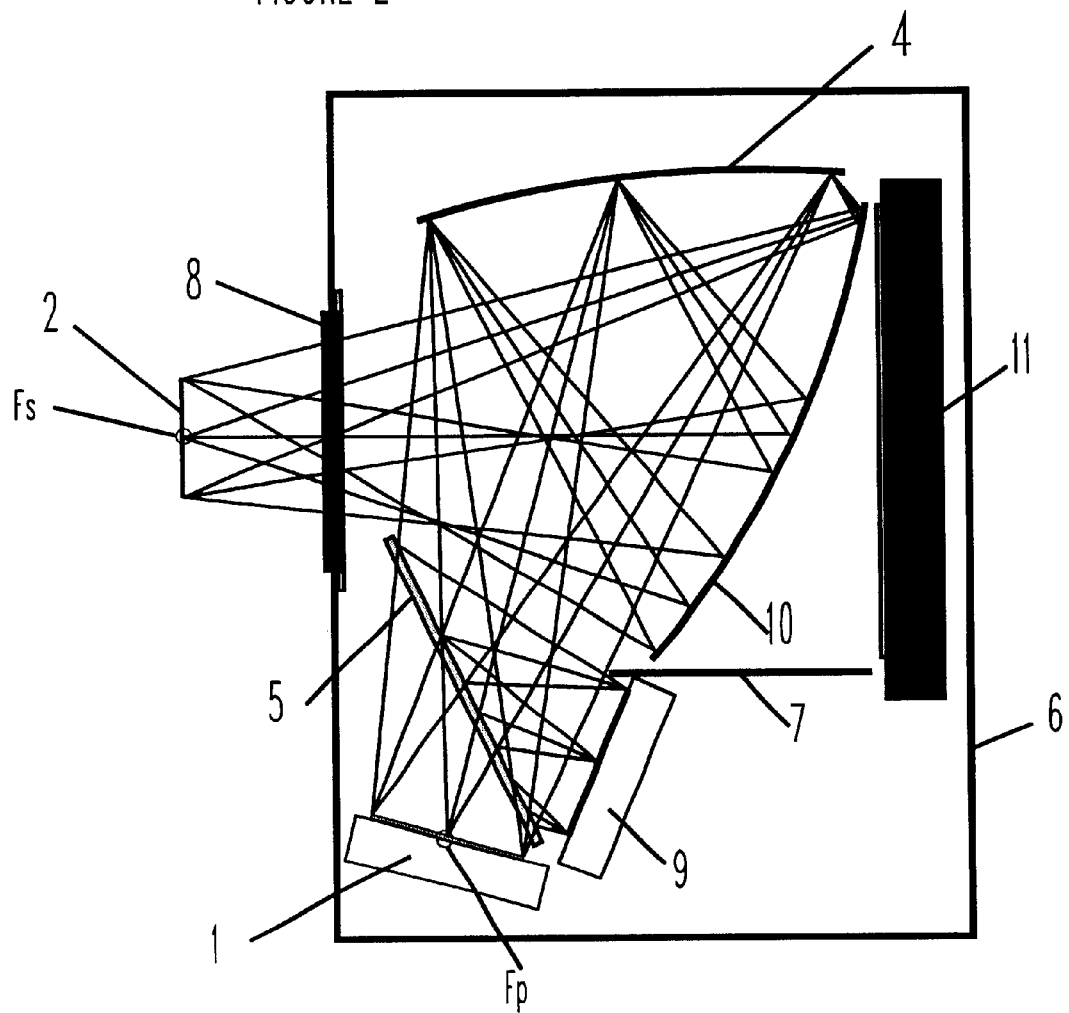
FIG. 2 shows an alternate embodiment to that of FIG. 1, showing a second background image source.

FIG. 2 shows essentially the same configuration of the invention as in FIG. 1, except the secondary reflector (10) is coated with a beamsplitter coating or semi-transparent mirror coating. The reflective coating preferably is on the concave surface of the reflector, but optionally is on the convex surface. If the convex surface is reflective coated, then the concave surface optionally has anti-reflective coatings applied, for example, to reduce secondary ghost imaging. As shown in FIG. 2, a second image source (11) is located behind the secondary reflector (10) and is visible through the reflector (10), so as to allow the second image source to be visible to the viewer, while simultaneously viewing the real projected image (2). This second image source optionally is a virtual image, a real image, or an infinity image (i.e., collimated light projecting an image at infinity), as well as an actual object, monitor, projector, projection screen, or the like.

The disadvantage of using a beamsplitter coating is that the brightness of the real image (2) is significantly reduced, since the beamsplitter coating has a reflectivity of approximately 60%, as compared to 96% for aluminum coating in the standard system. This is where the advantage of a real image (2) that has a brightness of 125% as compared to the LCD (1) becomes of greater value. As in the previous example of an 80% de-magnification, the 200 lumens per square inch emanating from the LCD (1) becomes 114 lumens per square inch for a standard system, such as, for example, in the device described in the Welck patent, as compared to 142 lumens per square inch in the present invention.

FIG. 2 also shows an optional fold mirror (5) in the primary reflector (4) optical path to allow the target object (9) to be positioned in a different location, such as, for example, when the footprint of the system requires a compact configuration.

Figure 3:
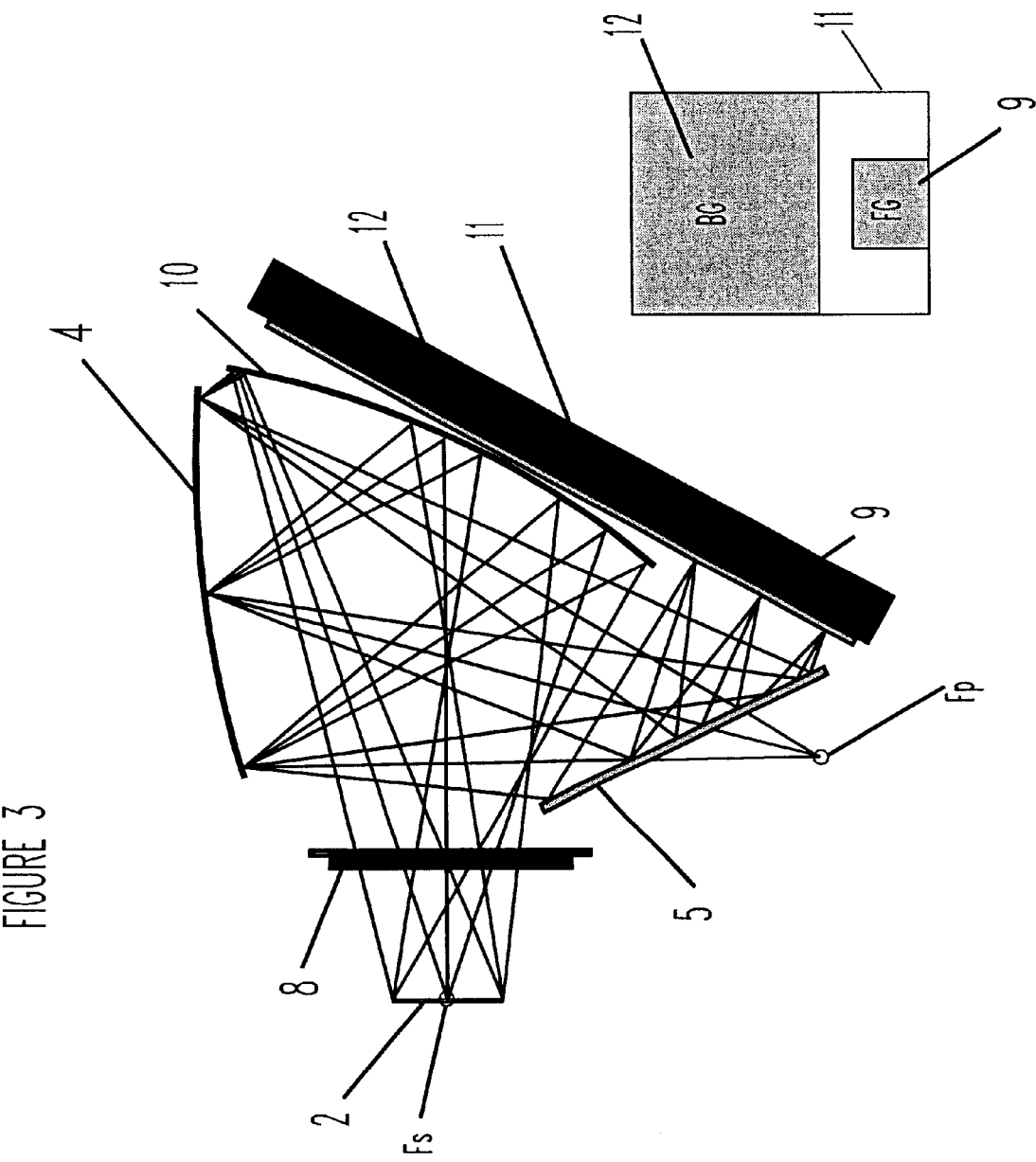
FIG. 3 is an alternate embodiment to that of FIG. 1, comprising the foreground and background input emanating from a common input source or single monitor.

FIG. 3 shows another embodiment of the present invention, wherein both foreground image source (9) and background image source (12) are formed on a common LCD or monitor screen (11). There is a significant advantage to this approach. Because both input sources (9,12) are displayed on the same input monitor (11), there is only one video signal required and one video source. In the configuration shown in FIG. 2, both input monitors (9,11) require a separate video signal. This would require a computer with dual video outputs, or two DVD players or VCR players and a method of synchronizing the two video streams together. The example in FIG. 3 requires only one video signal and one DVD or VCR. Since the foreground image and background images are recorded onto the same video frame, there is no need to synchronize the two image streams.

Figure 4:
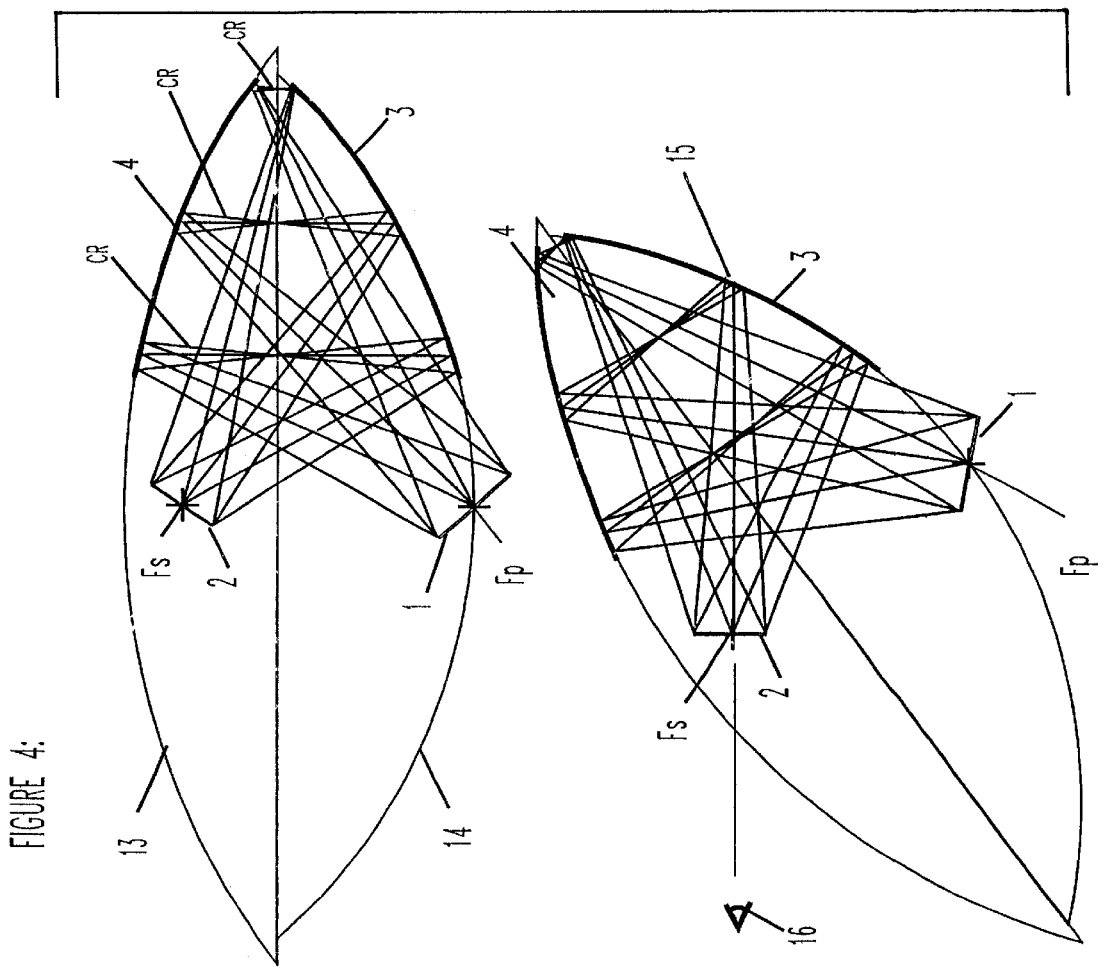
FIG. 4 is a beam-path ray-trace layout of the invention, showing the positioning of the reflectors in relation to the focal points for a de-magnified configuration.

FIG. 4 shows the light beam-path of an unequal focal length embodiment of the present invention, and the positioning of the components in relation to each other. Light from the target object (1) located at the focal point (Fp) of the primary reflector segment (4) is reflected off of the primary reflector segment (4) and is collimated, meaning that the rays emanating from a single point at the plane of the focal point (Fp) are parallel when they are reflected off the surface of the reflector segment (4). The collimated light beams are reflected off of the secondary reflector segment (3) and come to focus at the same point on a plane common to the focal point (Fs) of the secondary reflector segment (3).

The reflector segments (3, 4) are sectors cut from a full mirror or parent optic (14, 13), respectively. At least one optic, and optionally both, are aspheric. The secondary reflector (3) is positioned so that the vertex (optical center) of the secondary parent is located at the focal point (Fp) of the primary reflector (4). This insures that the reflected light rays are collimated (CR) and the resulting optical aberrations are minimized.

The lower portion of FIG. 4 shows the embodiment of the upper portion, rotated so that the view axis is horizontal, meaning the image located at the focal point (Fs), the physical center (15) of the reflector, and the viewer (16) are on a common axis.

Figure 5:
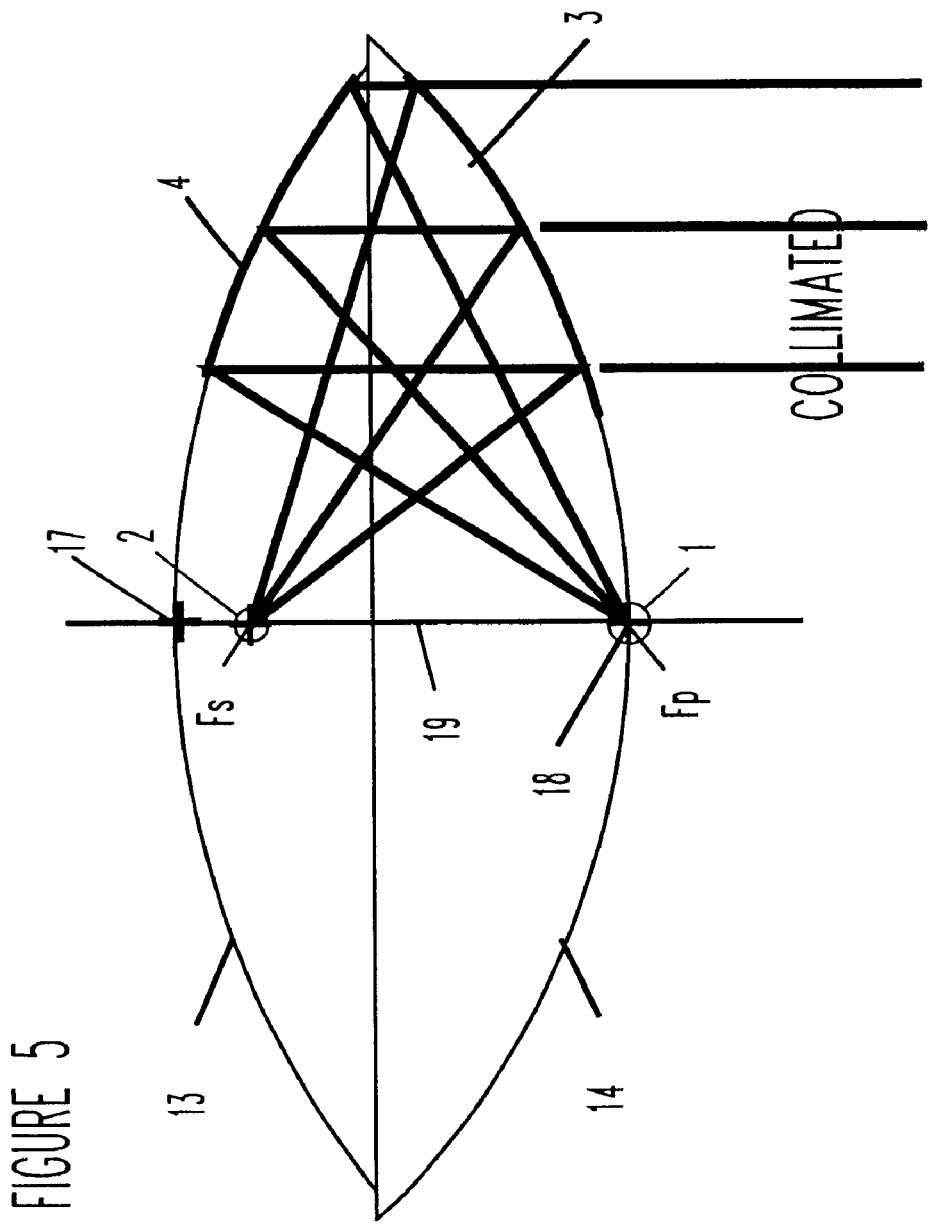
FIG. 5 and FIG. 6 show the comparison of the beam-path of the present invention versus the configuration of the Welck and Elings patents, when used in a de-magnified condition.

FIG. 5 shows the reflectors positioned to face each other, so that the focal point (Fp) of the primary reflector (4) is positioned at the vertex (18) of the secondary reflector parent (14), and the focal point (Fs) of the secondary reflector (3) is positioned on the common optical axis (19), or the imaginary line between the vertex (17) and focal point (Fp) of the primary parent (13), but not at the vertex (17) of the primary parent reflector (13). This configuration produces a de-magnified image (2). Because the target object (1) is located at the focal point (Fp) of the Primary reflector (4), the light beams or rays between the two reflectors (3,4) are collimated.

Figure 6:
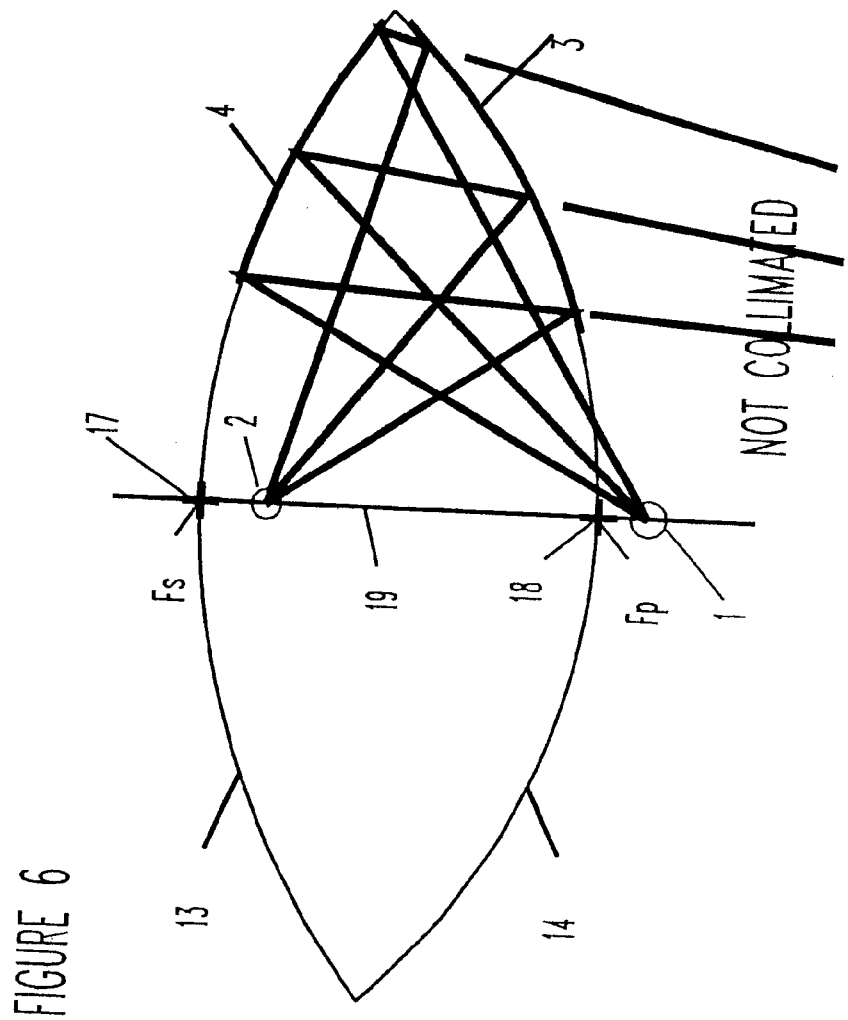

FIG. 6 shows the beam-paths of light in a prior art system, such as, for example, in the Elings or Welck patents, when de-magnified. The figure shows how the beam-path between the two reflectors is not collimated, when the system is configured to de-magnify the image. In a prior art system incorporating two parabolic mirrors of equal focal length, the only way to achieve de-magnification is to move the target object (1) along the optical axis (19), so that the distance from the target object (1) to the vertex (17) of the primary parent reflector (13) is greater than the distance between the focal point (Fp) and the vertex (17) of the primary parent reflector (4). When this is done, the light rays reflecting between the two reflectors (4,3) are no longer collimated or parallel, and optical aberrations occur. This results in a real image that is curved, even though the actual target object is not curved. Optical aberrations are a common occurrence, when parabolic systems are either operated off-axis, or when the object is located at a position other than at the focal point.

As shown in FIGS. 5 and 6, creating a de-magnified image by combining reflectors of different focal lengths maintains a collimated beampath between the reflectors, thus reducing optical aberrations and image distortions. When combined with aspheric surfaces of revolution, the image quality is significantly improved over that of a conventional system shown in FIG. 6. Aspherical optics are specifically designed to function in an off-axis condition and with reduced image degradation, when imaging at a point other than the focal point of the system. FIGS. 5 and 6 show the comparison of the present invention with the prior art, as described in the Welck patent, relating to de-magnifying each system.

Figure 7:
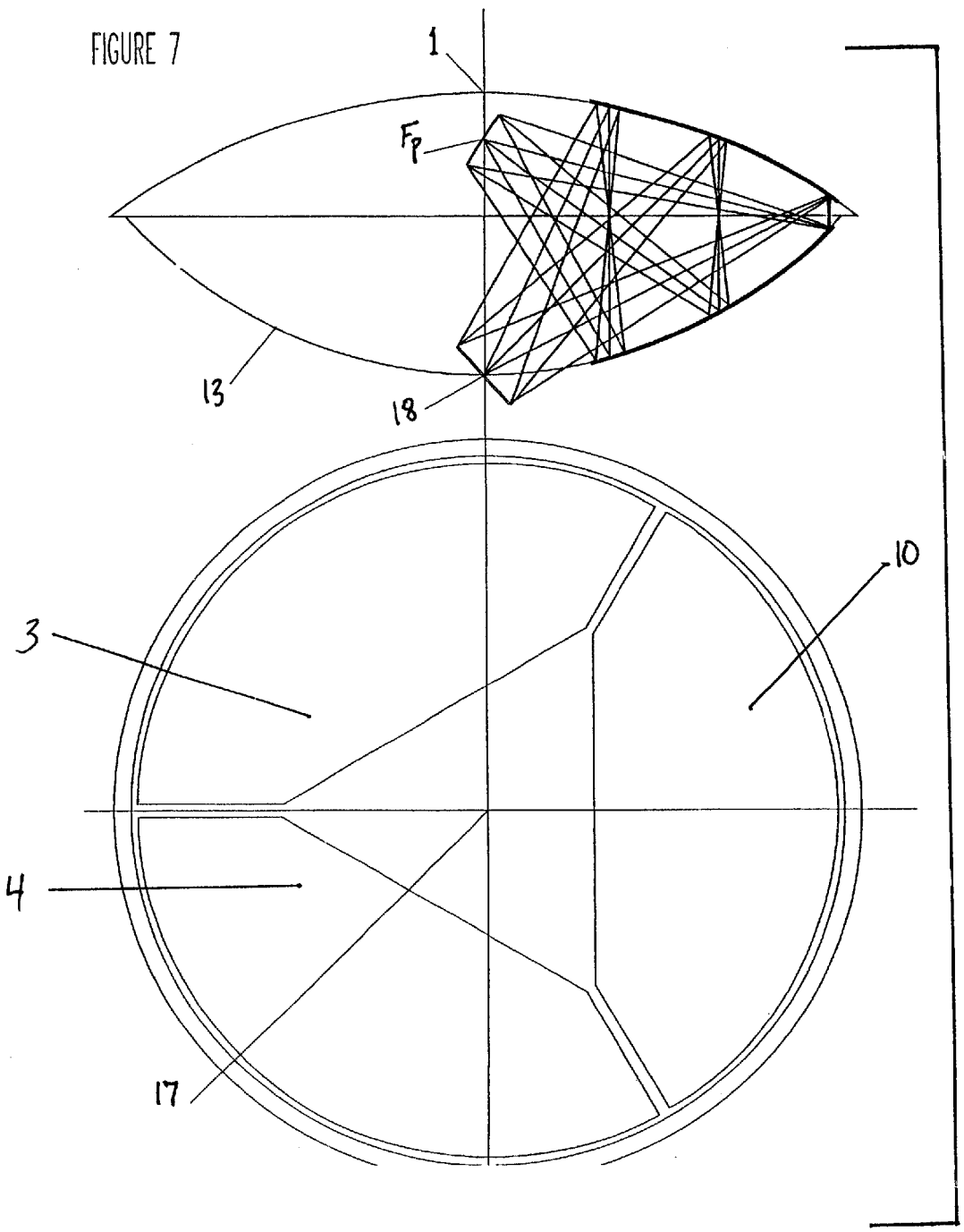
FIG. 7 shows an aspheric parent optic and an example of the relationship of a segment to the vertex and optical axis, as well as the relationship of the focal points to their respective vertex points, for a de-magnified configuration.

FIG. 7 shows an example of the invention having an aspheric reflector segment, and the position of the segment within its parent optic. In the example, the three segments are cut from the parent optic. The actual size and shape of the segment is determined based on the application. Changing segment size affects the fields of view or the angle in which the full real image is visible, as well as the distance to which the image is projected in front of the optical structure. Increasing vertical fields of view reduces projection distance, and reduces the size of the object that can be imaged.

Figure 8:
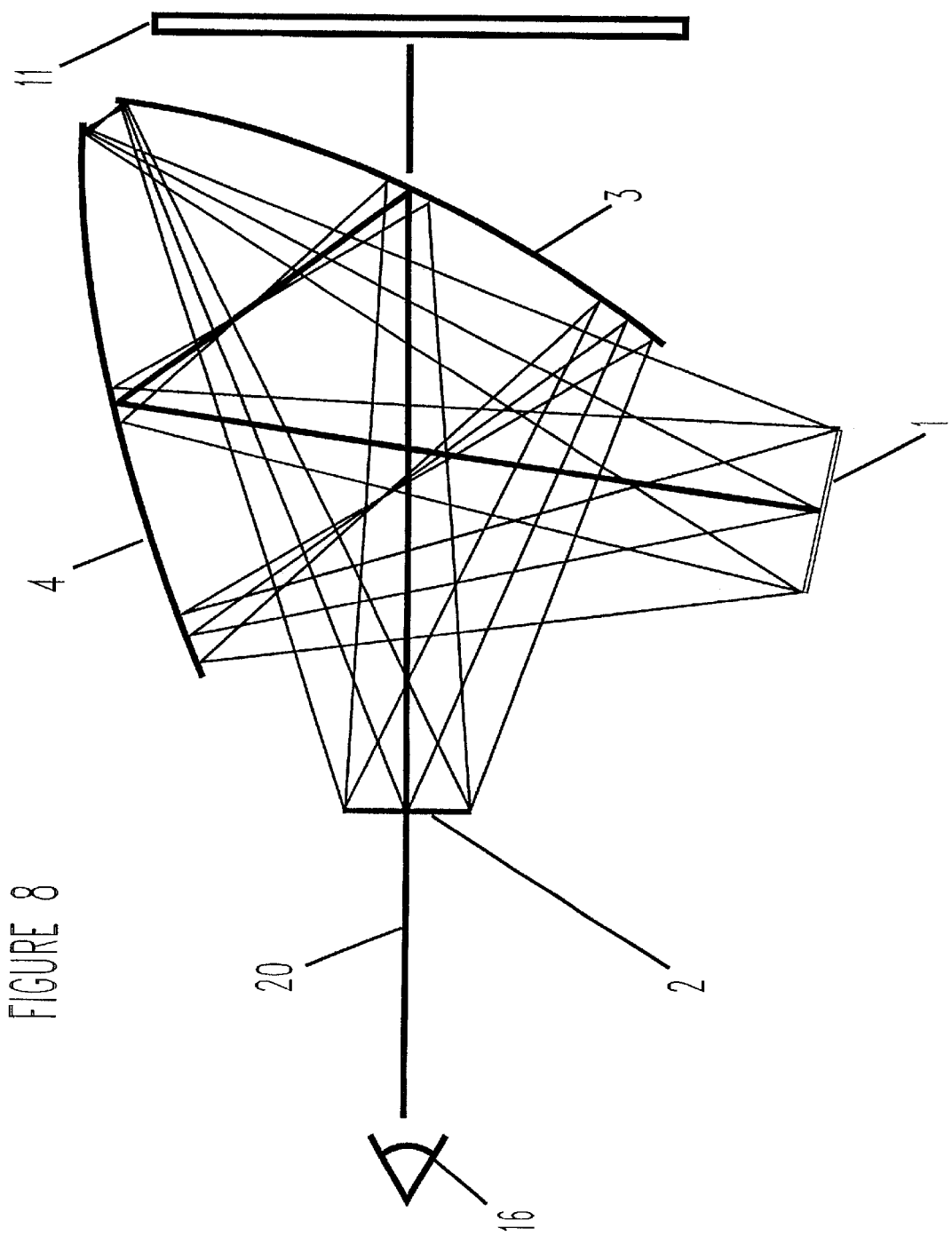
FIG. 8 shows an example of a possible optical arrangement and corresponding beam-paths of the present invention.

FIG. 8 shows a typical configuration of the present invention. The figure depicts the relationship of the two segments (4, 3 or 10), the background monitor (11), positioning of the target object (1), real image (2), viewer (16) and viewing axis (20).

Figure 9:
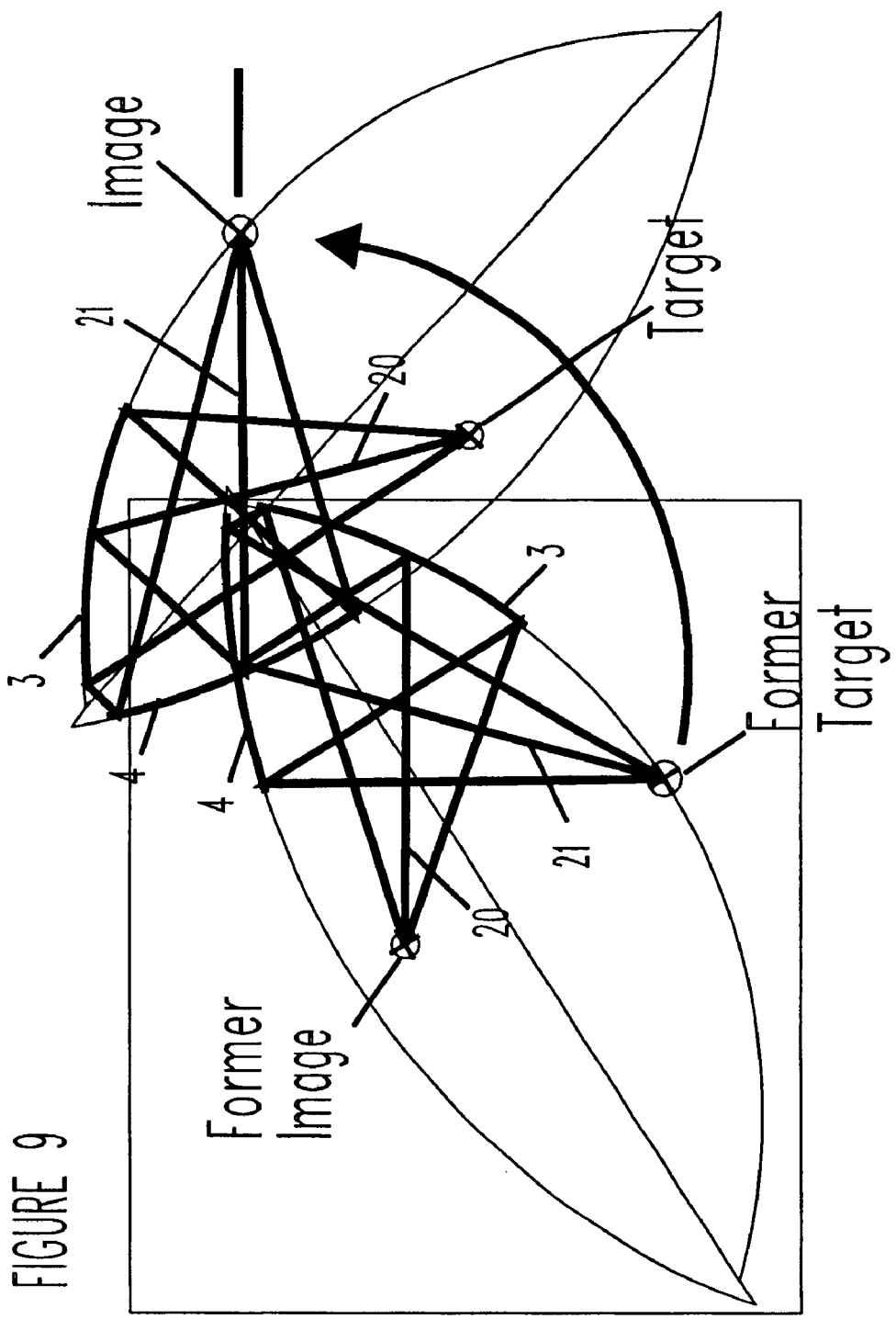
FIG. 9 and FIG. 10 show an embodiment of the present invention, wherein the device is rotated to provide a magnified image, by interchanging the target and real image position.
Figure 10:
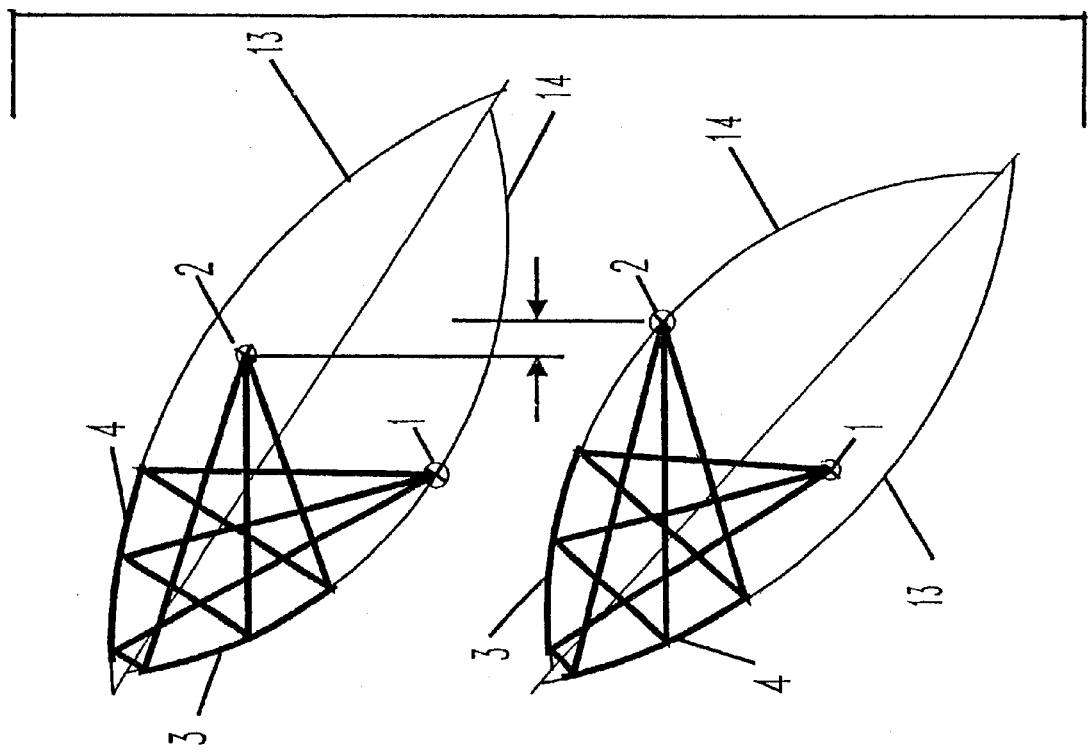

FIGS. 9 and 10 show an embodiment of the invention with the target (1) and image position (2) interchanged, and the system configuration rotated so that the optical path from the target (21) to the primary reflector of longer focal length (4) is substantially coincident with the viewing axis (20). The result is that the axis of the image is made coincident with the viewing axis. This creates a magnified image with increased projection distance, and the rays between the two reflectors remain collimated, thus reducing aberration inherent in magnifying with two equal focal length parabolic reflectors. The real image (2) is projected by the segment of longer focal length (4) and magnified, based on the ratio of the two focal lengths, calculated by the longer focal length divided by the shorter focal length. Simply stated, as shown in FIG. 10, if the target object (1) is placed at the focal point of the segment of shorted focal length (3), a magnified image (2) appears at the focal point of the segment of longer focal length (4).

Figure 11:
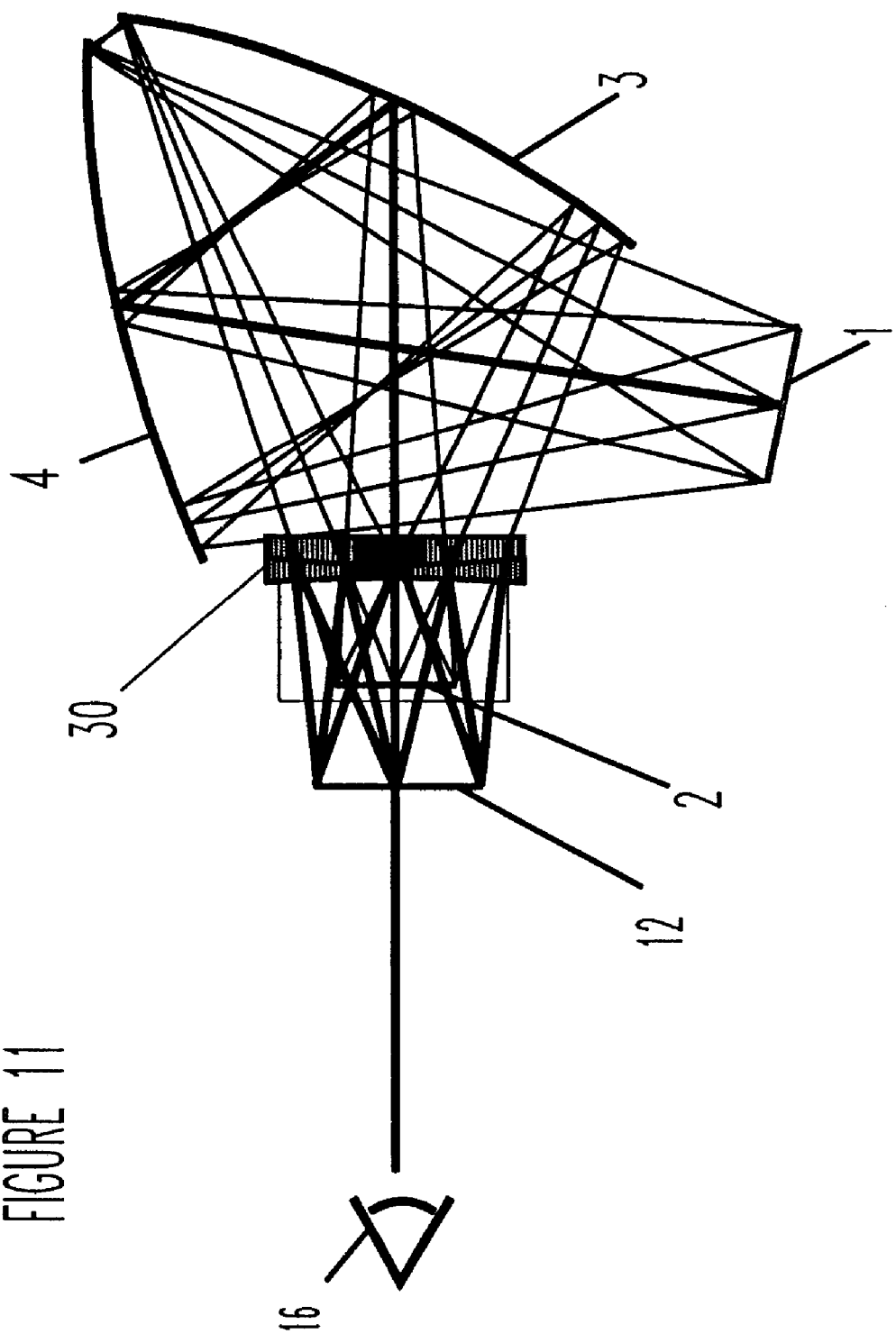
FIG. 11 and FIG. 12 show an optional lens element or secondary optical assembly used to modify the focal point of a reflector segment.
Figure 12:
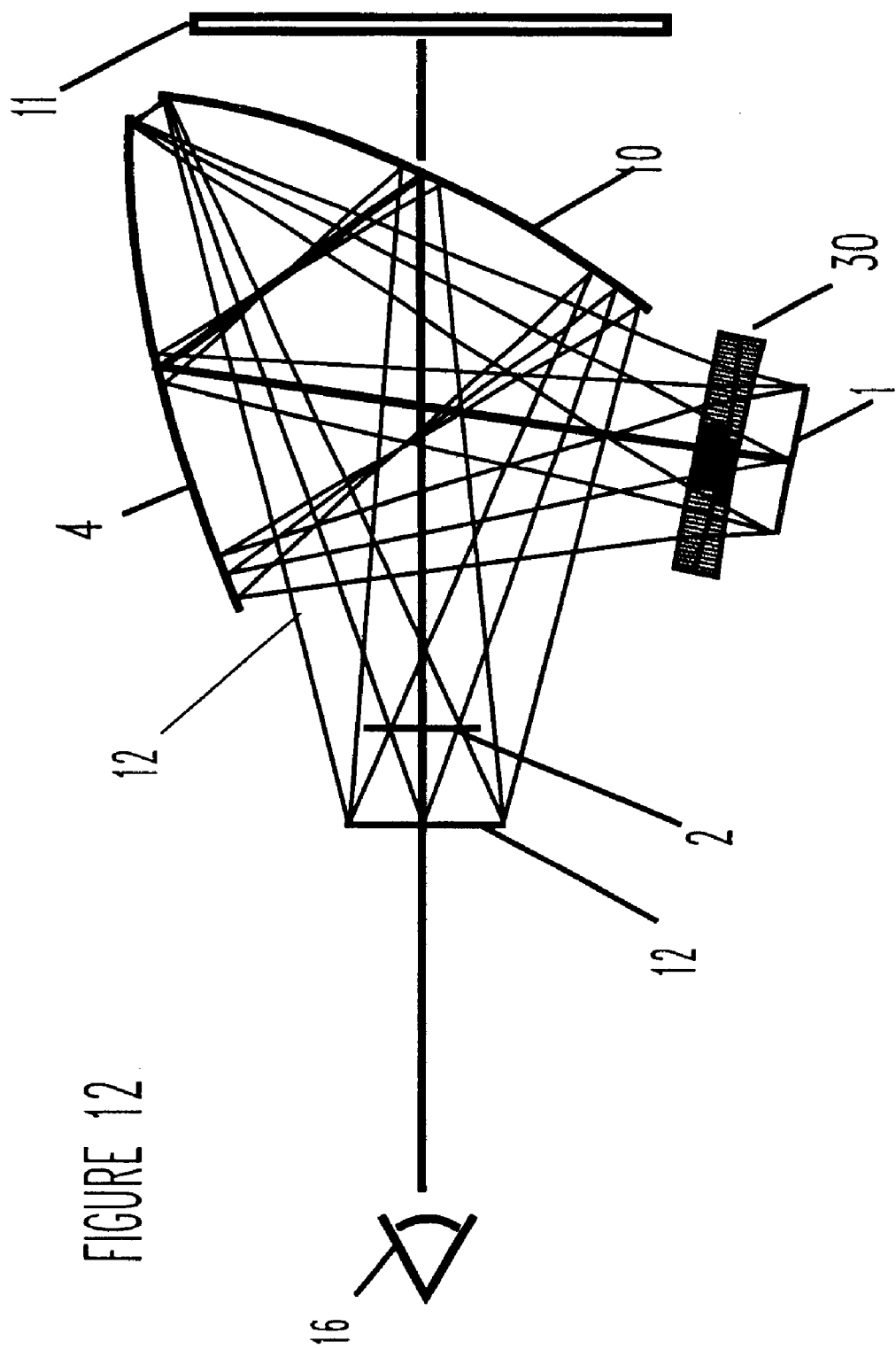

FIGS. 11 and 12 show the addition of an optional lens element (30) to modify the focal point, or location of the target object or its image, of one or both reflector segments. The lens element optionally comprises a lens, lenses, or a lens assembly. The lens element allows the target position or the imaging position to be relocated, without changing the focal lengths of the respective reflectors. In FIG. 11, a secondary optical element (30) is placed in the beam-path between the secondary reflector (3) and viewer (16), which changes the focal length of the system, thus moving the real image (2) to the new position (12). An alternate configuration is shown in FIG. 12, with the secondary optical structure (30) positioned in the beam-path between the target (1) and the primary reflector (4). This is extremely valuable because it offers many more variations of magnification. For example, four different focal length segments can be combined to achieve six different magnifications, while adding a lens element can increase the number of magnifications available to twelve. This is a big advantage in reducing tooling costs and inventory requirements. For example, by combining various lens elements with various focal length reflectors, a much greater combination of magnifications is achieved with less focal length reflector inventory and tooling. The lens element optionally is optimized to improve image quality. For example, the additional lens element, when placed in front of the target source or monitor, optionally is designed to reduce the effects of natural aberrations within the system.

Figure 13:
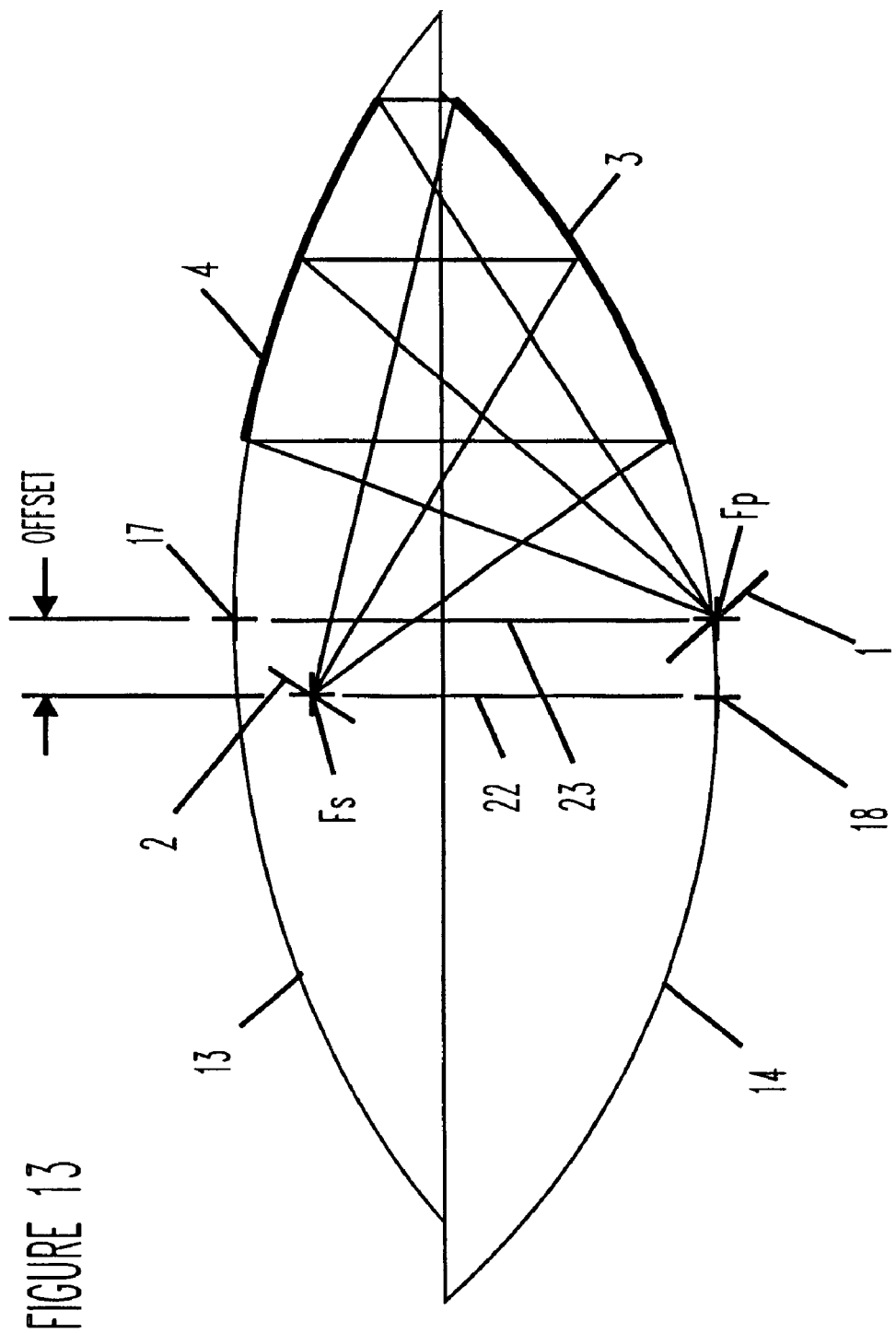
FIG. 13 and FIG. 14 show the modification to the image position achieved by repositioning the two parent reflectors axes offset from each other, while maintaining the two axes parallel to each other.
Figure 14:
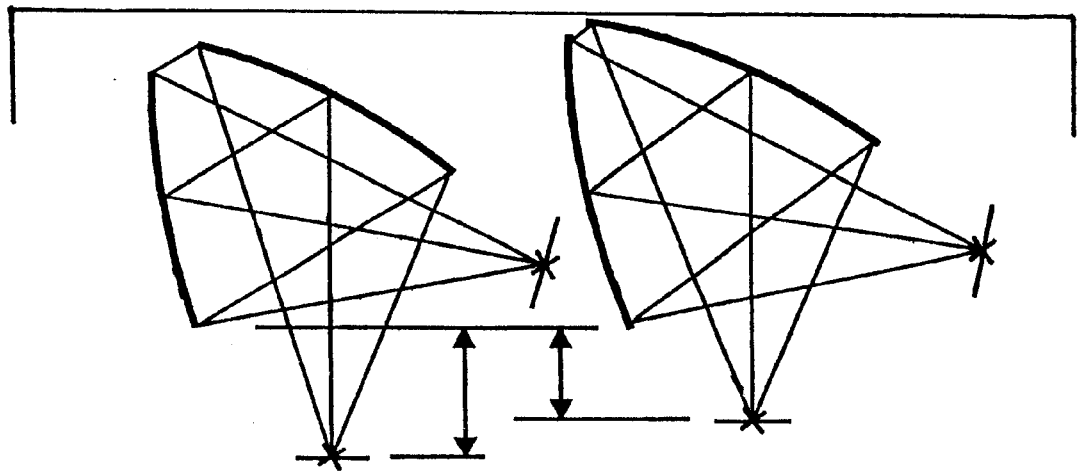

FIG. 13 and 14 show an embodiment of the present invention wherein the two reflector segments (4,3) are positioned in an offset condition to one another. This is achieved by offsetting the optical axes (22,23) of the two parent optics (13, 14) so that they do not share a common axis, but the two axes (22, 23) are maintained parallel to each other. By offsetting the optical centers, the projection distance or positioning of the image is increased or decreased, depending upon the direction in which it is shifted, without changing the magnification of the system. This allows the position of the real image to be moved in relation to the optical structure, without affecting magnification. The focal point (Fs) of the secondary parent (14) is no longer coincidental to the optical axis (23) of the primary parent (13). As shown in FIG. 14, this increases the projection distance by an amount equal to the offset, without affecting the magnification of the system. Offsetting the optical axes also is optionally used in systems comprising equal focal length parabolic reflectors.

Figure 15:
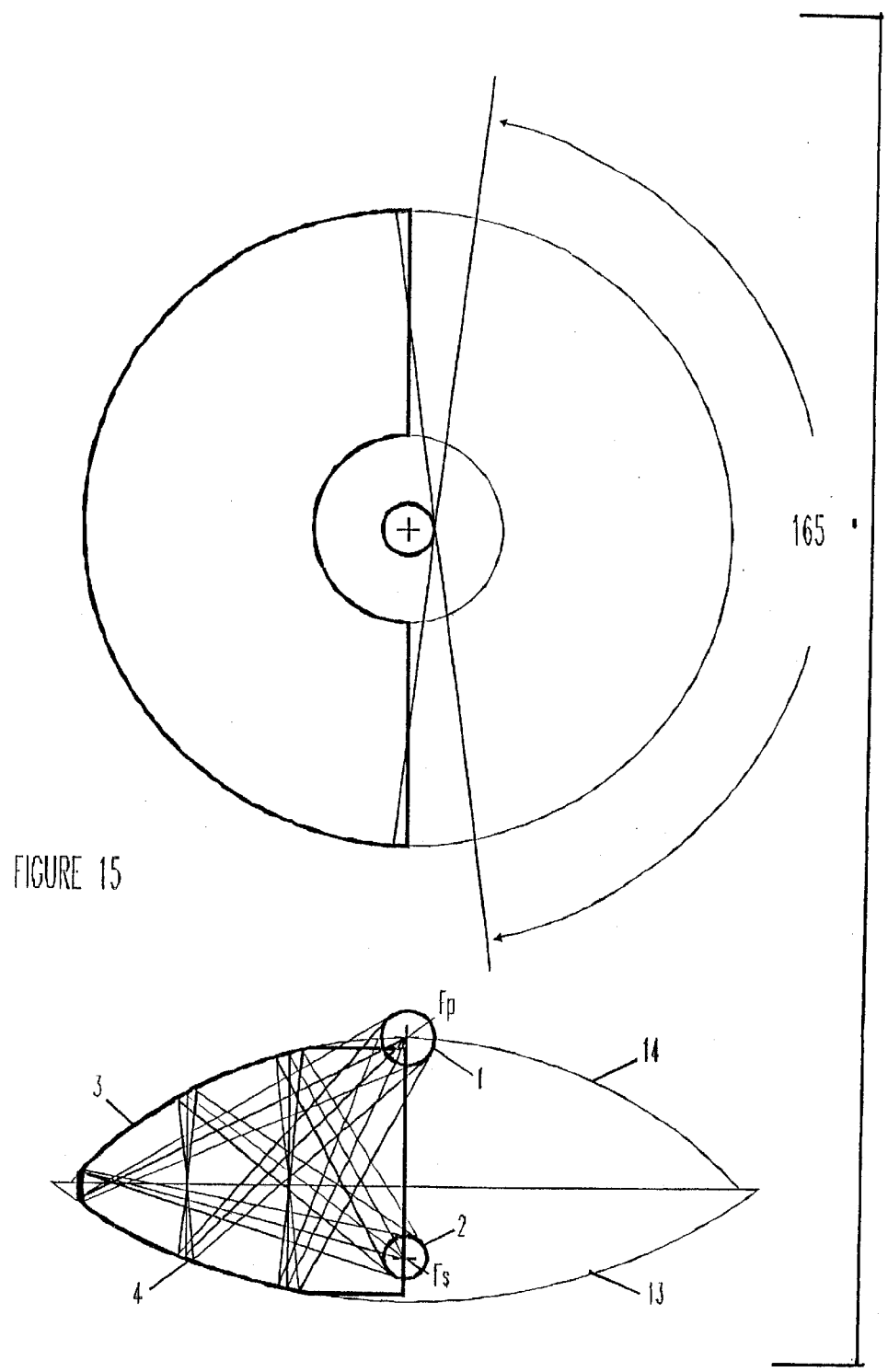
FIG. 15 shows a 180 degree field-of-view embodiment of the present invention.

FIG. 15 shows a 180-degree field of view embodiment of the present invention. This embodiment of the invention is used much like the prior art 360 degree system described in the Elings patent, however, the present invention uses at least one aspheric sector (3,4) of unequal focal length in a magnified configuration. The same system optionally is inverted to create a de-magnified configuration, or optionally includes equal focal length segments to project a 1×-magnification image. The segments optionally are of various degrees (i.e., sizes), depending upon the desired field of view required for the particular application.

Figure 16:
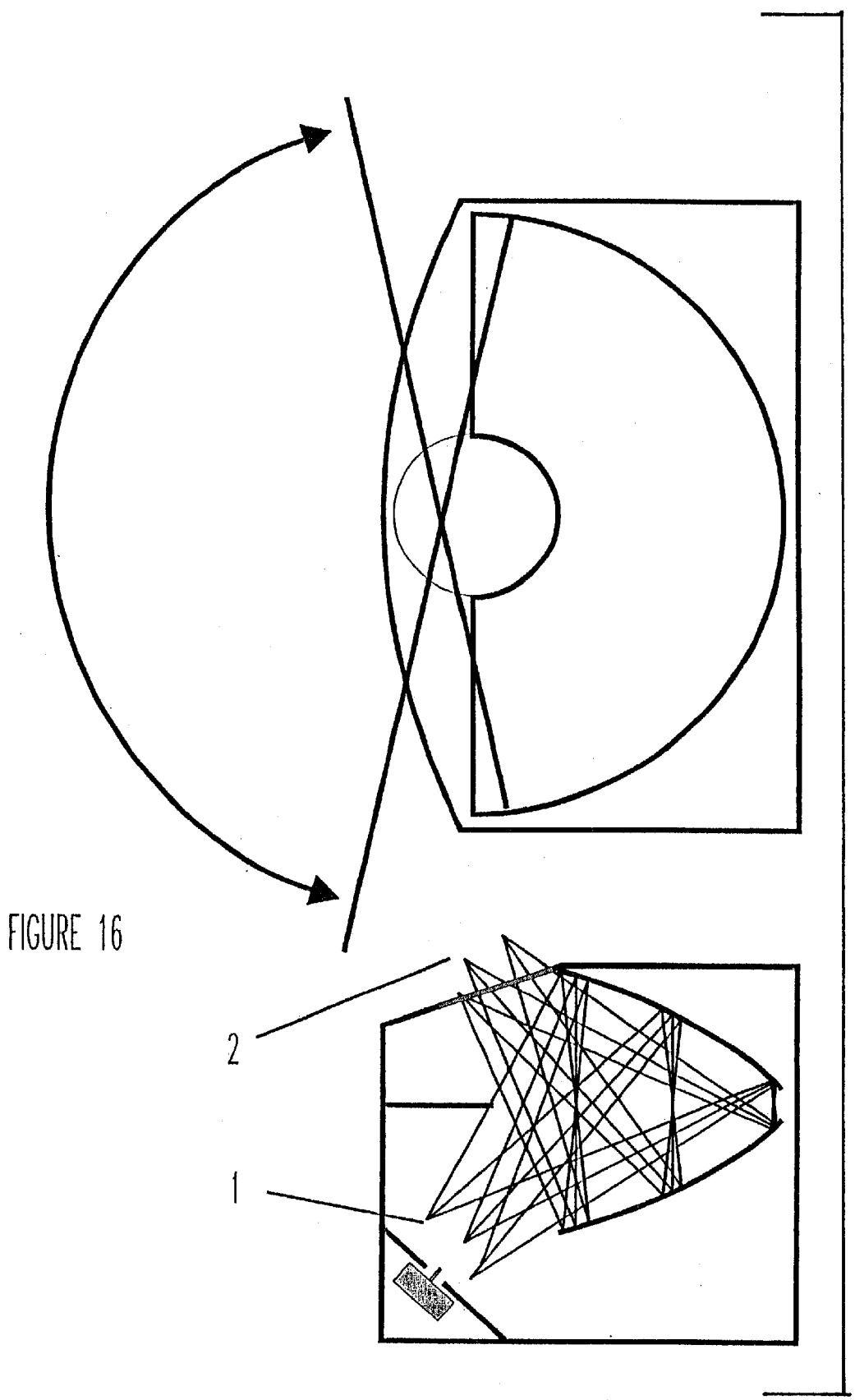
FIG. 16 shows the 180 degree embodiment of FIG. 11, used as a jewelry display.

FIG. 16 shows an embodiment of the present invention used as a jewelry display, wherein the real object (1) is secured inside the unit and a real image (2) is displayed floating above the unit's aperture.

Figure 17:
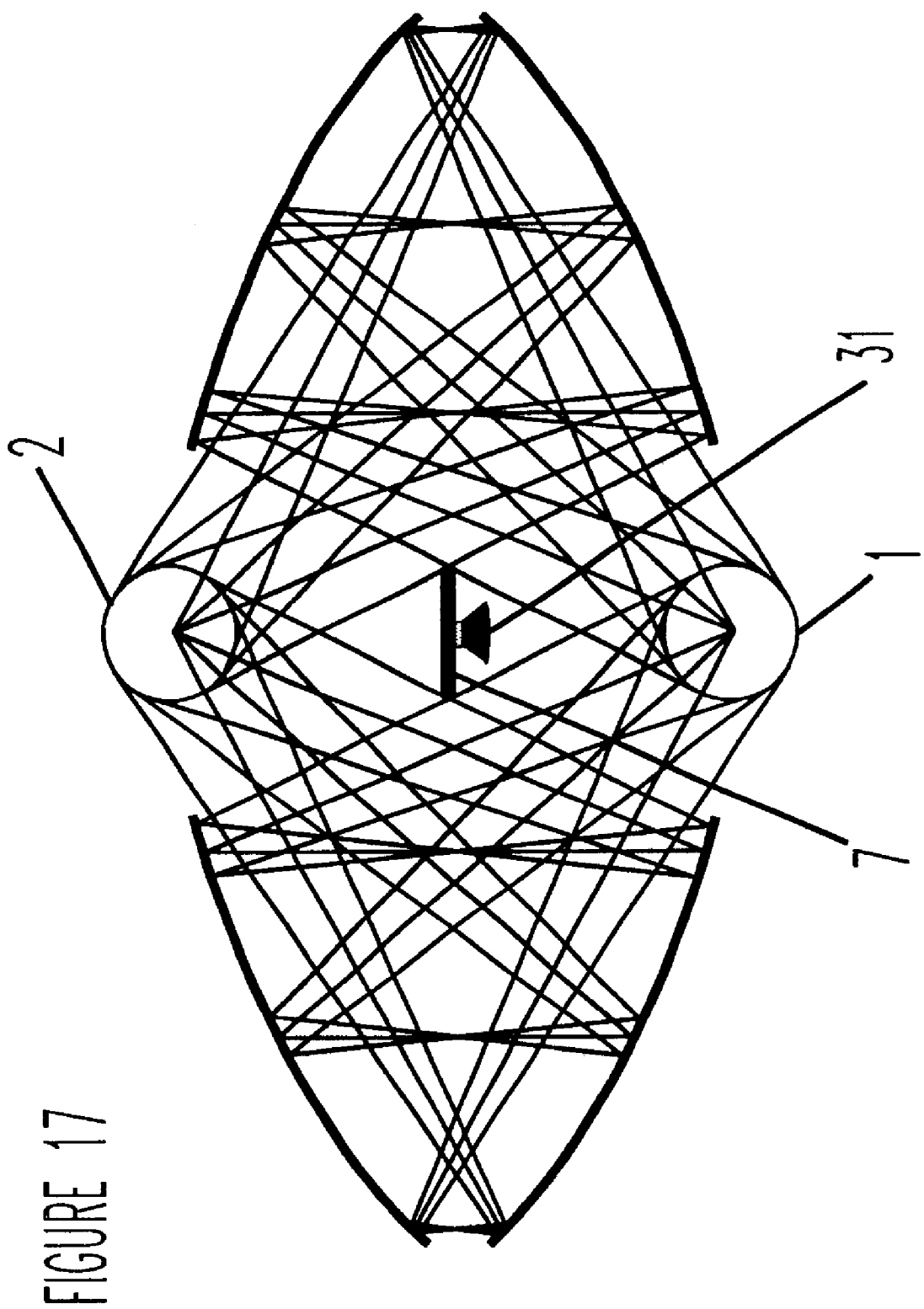
FIG. 17 shows a 360 degree field of view embodiment of the present invention, using the full parent optics.

FIG. 17 shows a 360-degree field of view embodiment of the present invention using the full aspherical parent optics. The target object (1) optionally is illuminated by a lamp assembly (31), which is hidden from view under a baffle (7). The baffle is located on the imaginary line between the vertices of the parent optics, and positioned midway between the two focal points of the system. The purpose of the baffle is to block a direct view of the target object, when viewing the system through the view aperture at the top. The system performs exactly as the 180-degree system described in FIG. 11, except that the aspheric reflectors are not segments, thus creating a full 360-degree system using the full parent optics. The depth or "sag" of each curve limits the maximum diameter, when the focal points are positioned at the desired location. In a normal 360 system of two equal focal length parabolas, the maximum diameter is 2.828 times the focal length, while the maximum diameter may be greater, based on the curvature selected. This allows the focal points of each reflector to be positioned at the vertex of the other reflector, so that there is no interference between the edges of the two reflectors. Optionally, one or more of the mirrors also have an aperture cut therein. This optionally is in an area that has not been coated with a reflective coating. The aperture preferably is of a diameter that does not significantly reduce the field of view, while still allowing the formation of a reasonable size image. The optimum has been found generally to be a diameter approximately 30% of that of the parent optic.

Figure 18:
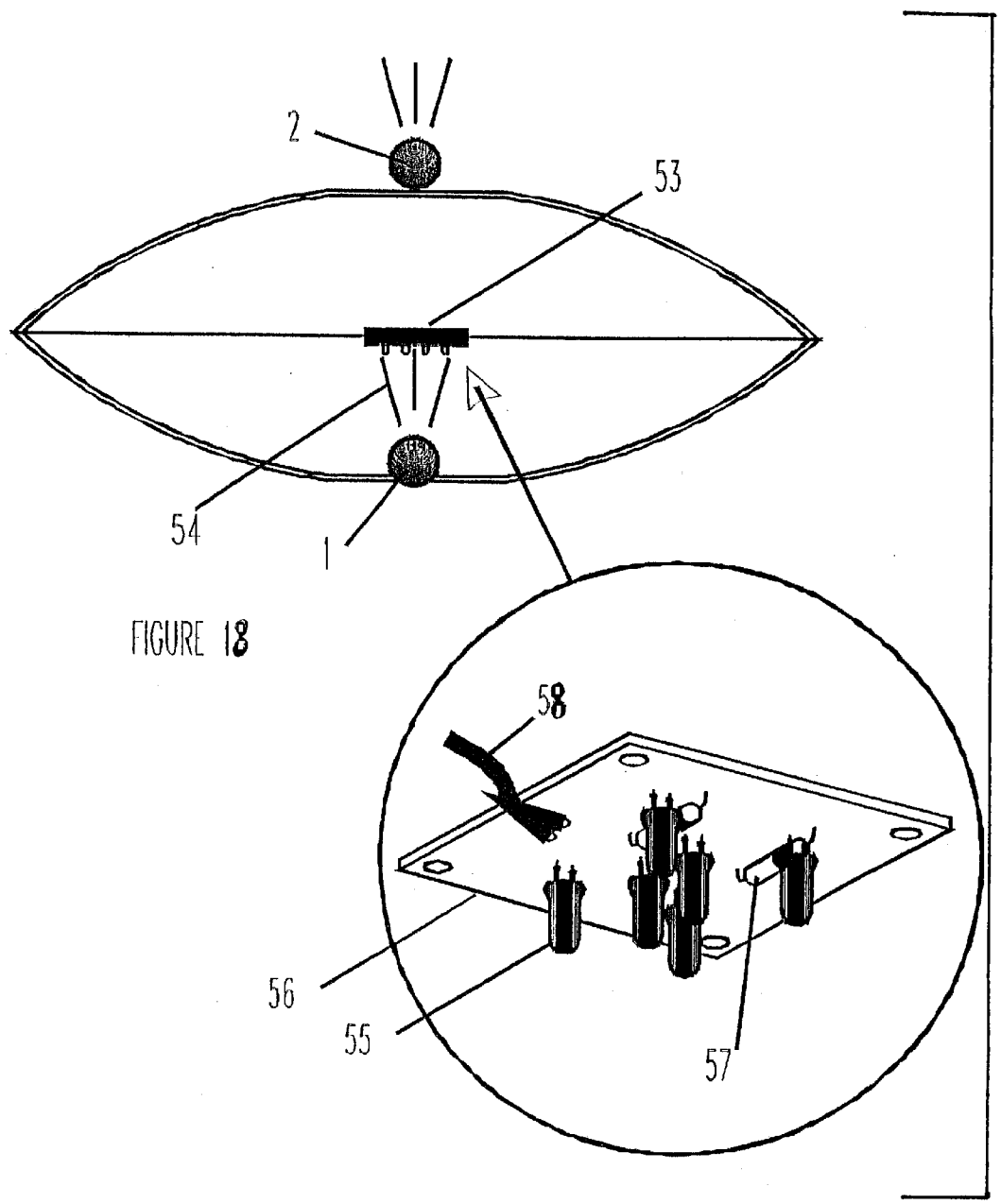
FIG. 18 shows the lighting system for the 360 configuration.

FIG. 18 shows an example of internal lighting for a 360 system. A Light Emitting Diode array "LED" (53) is used to provide concentrated light (54) on the target object (1). The individual diode "LED" is a high-output, low-voltage, white-light emitting diode. The LED's emit cold light, with a focused output of approximately 6 degrees. LED's are excellent for the 360 application because they have a rated life of 100,000 hours as compared to 2000 hours for a halogen bulb. The LED's (55) are attached to a printed circuit board (56), along with current limiting resistors (57) and powered by a 12 volt DC voltage source (58). Optionally, a rheostat (dimmer) is included in the power line (58) to vary the light intensity. The LED cold lighting systems eliminate the need for fans or cooling within the display system, since they generate virtually no heat, and because the LED's have a rated life of over 11 years, they are relatively maintenance free.

Figure 19:
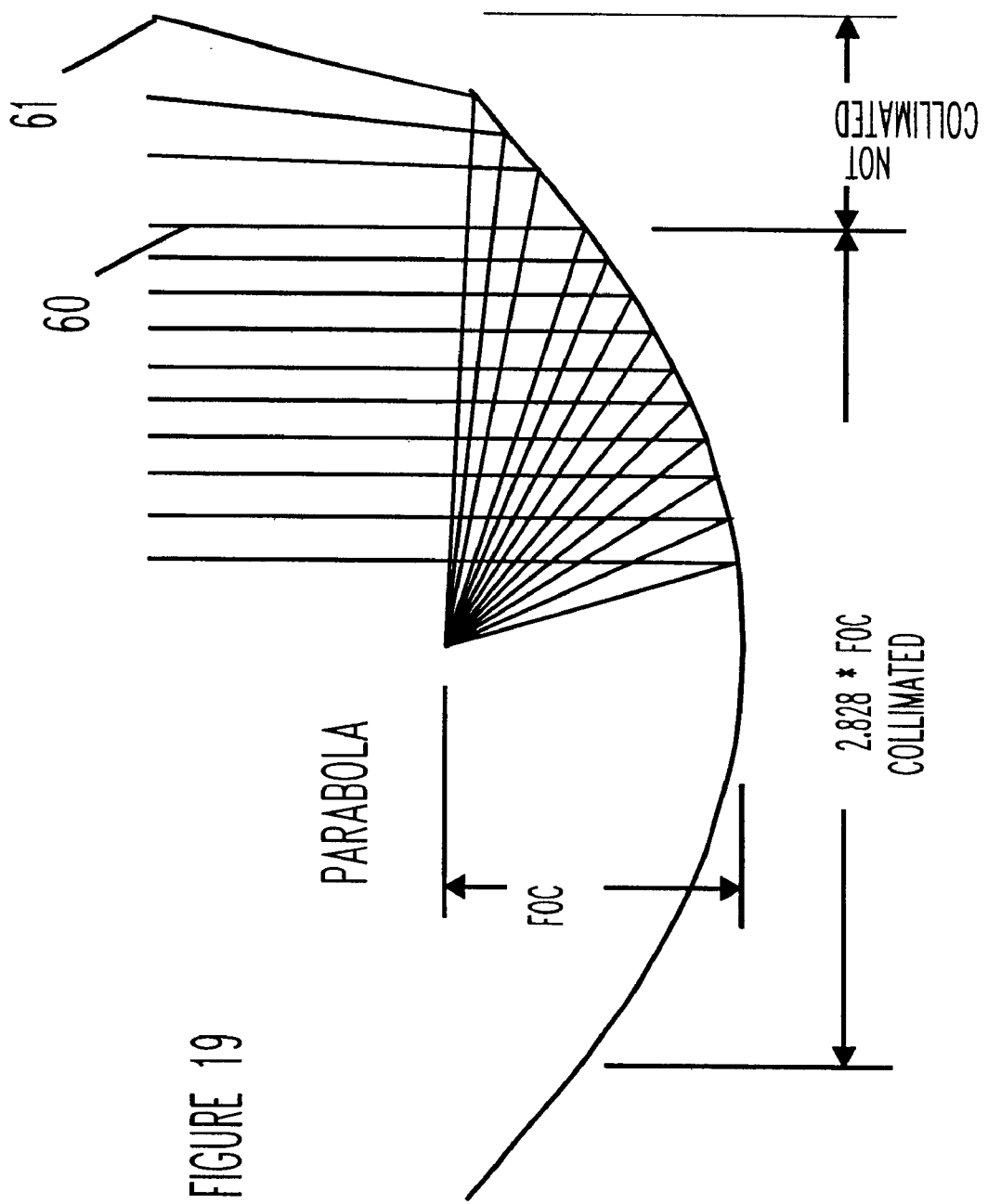
FIG. 19 and FIG. 20 show the differences and advantage of an asphere over a parabola, when larger diameter optics are required.

FIG. 19 shows an example of the beampath for a parabola that exceeds the 2.828:1 ratio of "Maximum Diameter to Focal Length". A parabola reflects collimated light (60) only within a diameter of 2.828 times the focal length (FOC). Light reflected from a surface outside of the 2.828×FOC area is reflected as "un-collimated" light (61).

Figure 20:
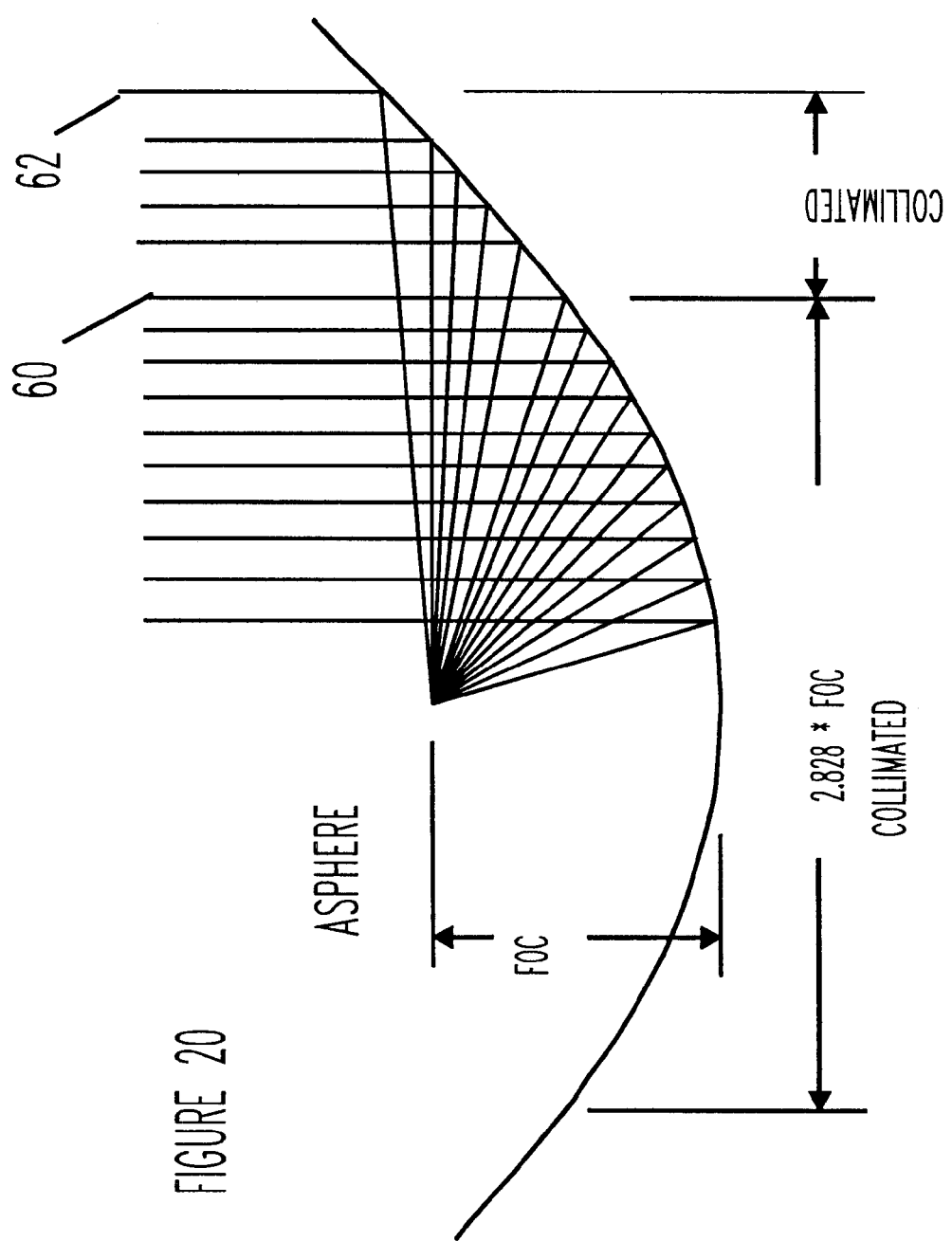

In FIG. 20, the aspheric reflector reflects collimated light both within the diameter of 2.828×FOC (60), and also reflects collimated light outside the maximum diameter (62).

Figure 21:
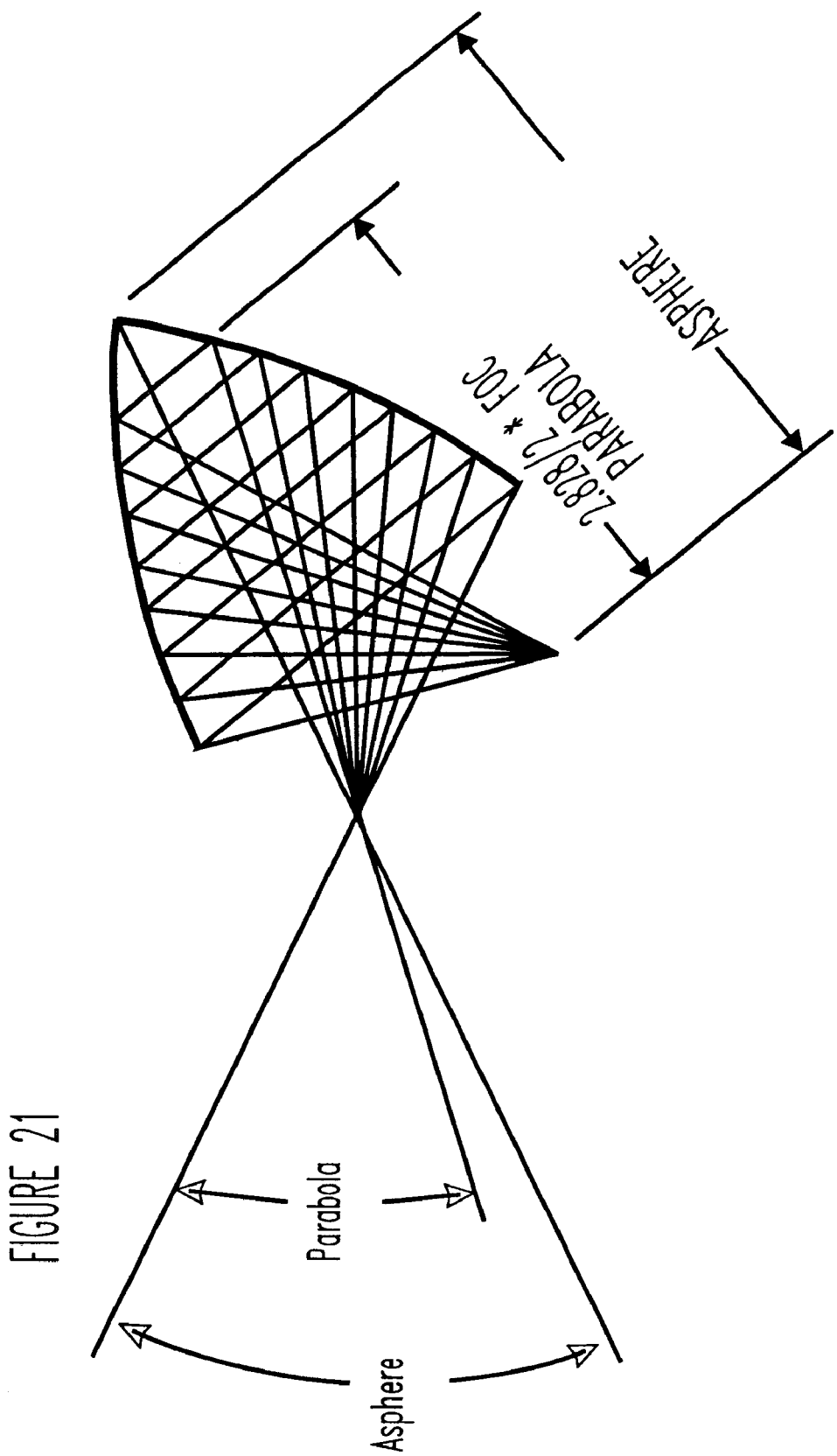
FIG. 21 shows how an asphere can increase fields of view of a dual parabolic visual display system.

FIG. 21 shows how an aspheric segment cut from a parent optic larger than 2.828 time the focal length, provides a larger field of view than a conventional parabolic system, such as described in the Elings and Welck patents.

Figure 22:
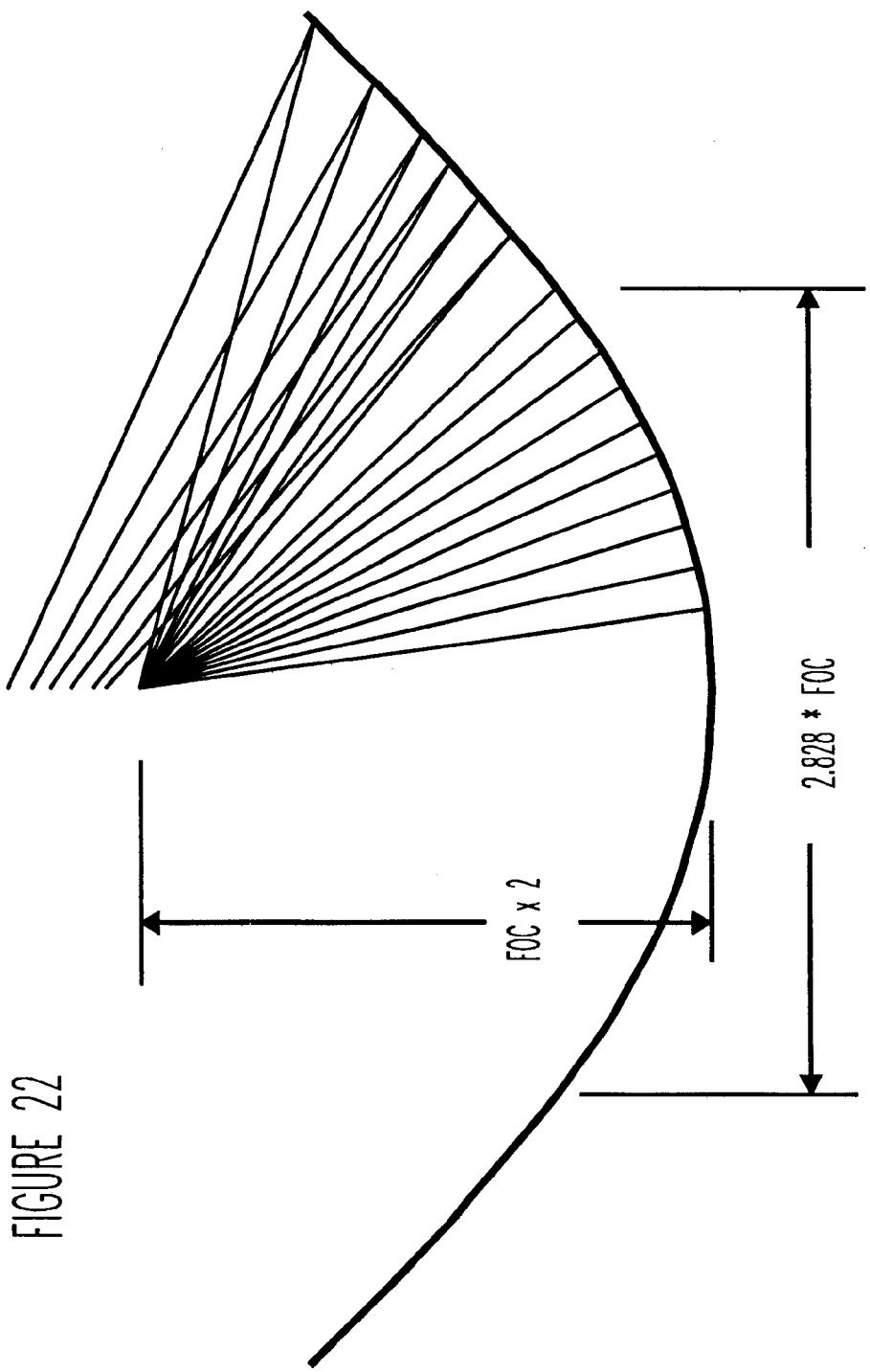
FIG. 22 shows the effects of using a parabola larger than 2.828 times the focal length in a real image display system.

FIG. 22 shows what happens when a parabola larger than 2.828 times the focal length is used in a conventional display system.

Figure 23:
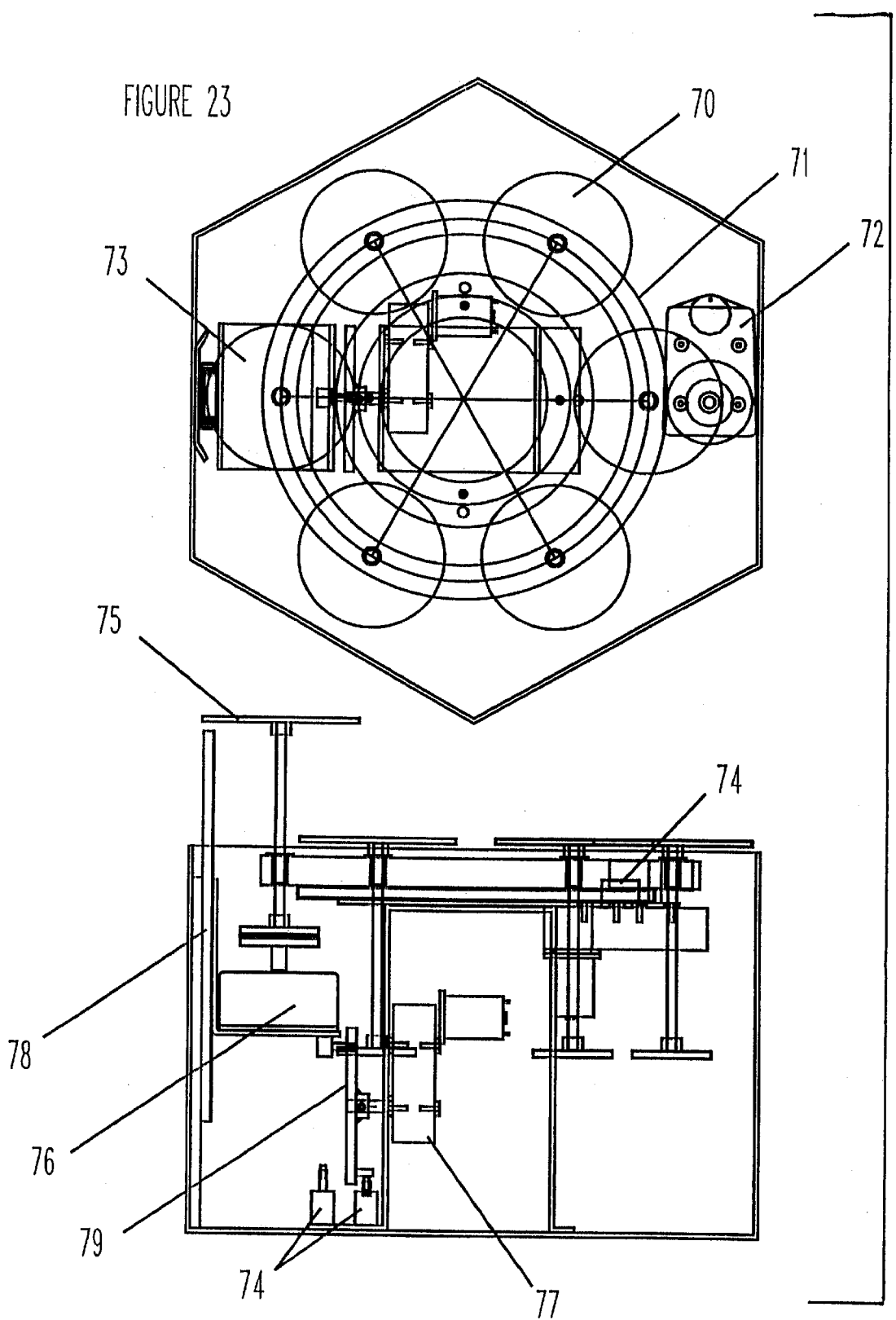
FIG. 23 shows an example of design details for a multi-station indexing turntable for a real image projection system.

FIG. 23 shows an example of an optional multi-station indexing input device for a real image projection system. The example shown has six independent turntables (70) mounted on a turret assembly (71). The turret is motor driven (72) so that each turntable (70) may be rotated into the display position (73). Incorporated is a sensing device, such as a limit-switch or micro-switch (74), to sense when the turret is in the desired position (73). When the turntable is in the display position (73), the turntable is raised into position. The device shown uses a turntable drive motor (76) mounted onto a vertical slide assembly (78) and is raised into position (75) with a cam wheel (79) mounted to a drive motor (77). The entire device is powered and controlled using a small microprocessor programmed to perform the necessary operations in sequence.

Figure 24:
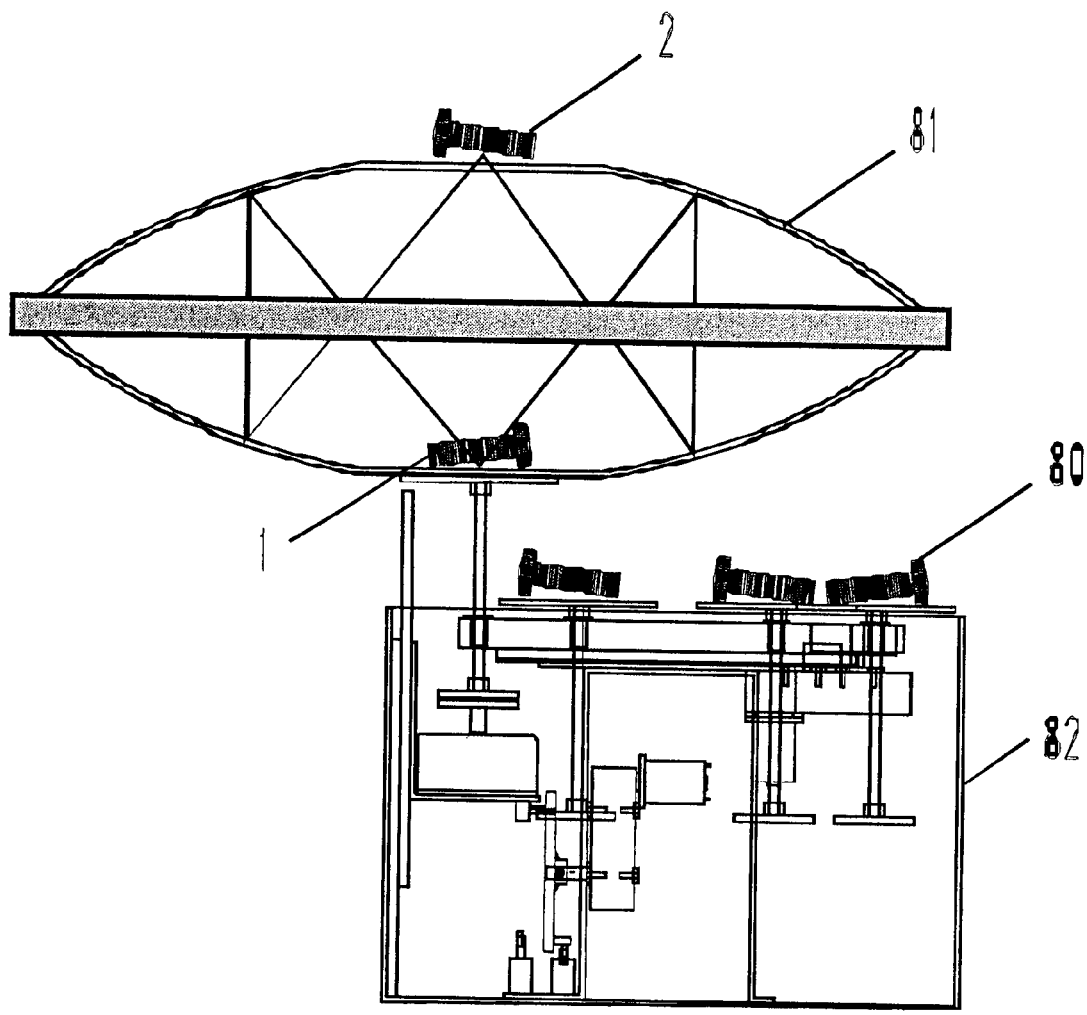
FIG. 24 shows an example of how the indexing turntable is used with the 360 configuration.

FIG. 24 shows an optional indexer (82) mounted to a "360" display system (81). Six watches (80) are positioned on the six turntables. The device indexes the first turntable into position, and raises it, so that the target watch (1) is located at the focal point of the 360 display and an image (2) is formed, floating above the 360 display unit. The watch slowly turns, and when a preprogrammed display time is reached, the turntable lowers and the next turntable indexes into position, raises to the focal point, and displays another watch.

Figure 25:
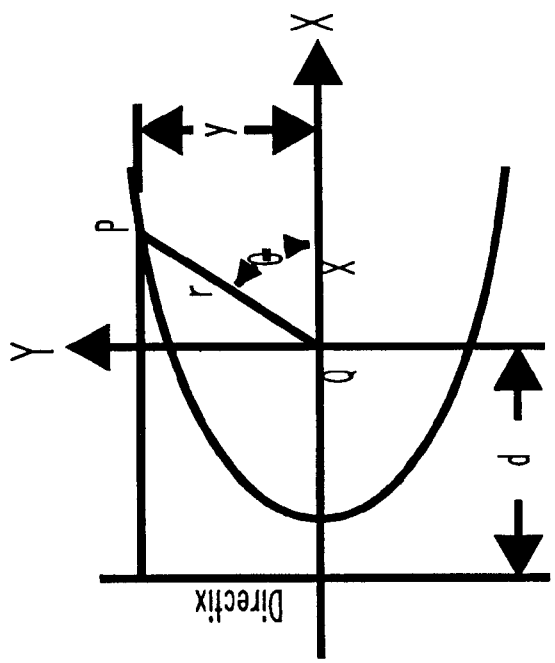
FIG. 25 and FIG. 26 show the curves and graphs for calculating a standard conic surface of revolution and an aspheric surface of revolution.

FIG. 25 shows the graphs for calculating a standard conic surface of revolution.

Figure 26:
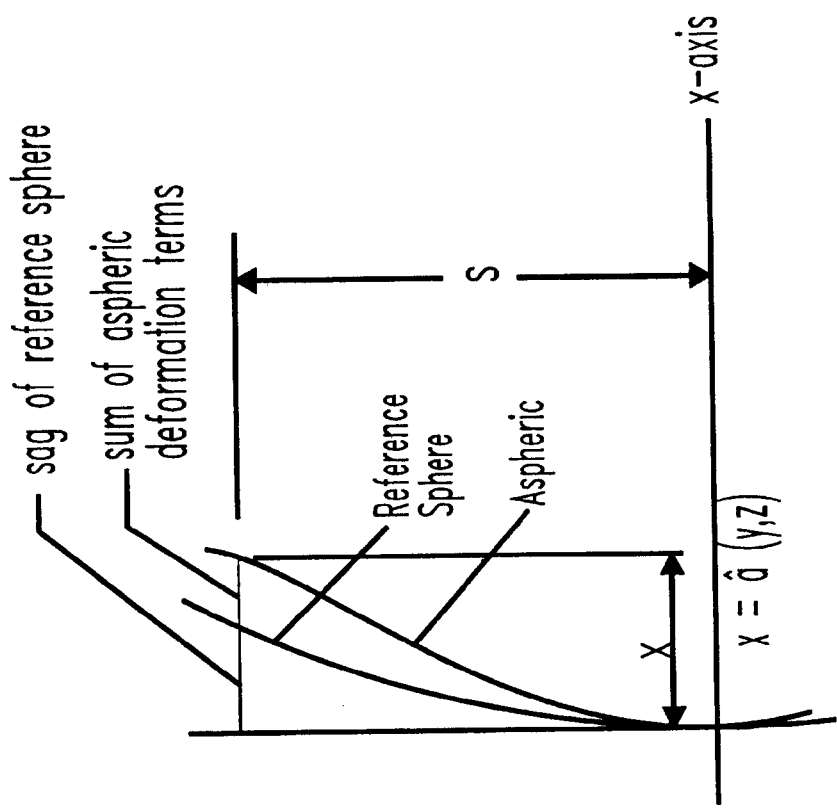

FIG. 26 shows the graphs for calculating an aspheric surface of revolution.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A real image projection system, comprising:
 a) a visual staging station defining a space for viewing images from a vantage point along a viewing axis; and
 b) at least two curved optics of the conical family of curves, at least one of said optics comprising an aspherical surface of revolution, wherein said curved optics are arranged such that an object positioned substantially at or near a focal point of one of said curved optics forms a real image positioned substantially at or near a focal point of another of said curved optics, and said real image is projected along said viewing axis and appears as a floating image when viewed from said visual staging station.

2. The real image projection system of claim 1, said curved optics comprising primary and secondary curved reflector segments, wherein said primary reflector segment is of longer focal length, relative to said secondary reflector segment.

3. The real image projection system of claim 2, comprising an object positioned substantially at a focal point of said primary reflector segment of longer focal length, such that a real image is positioned substantially at said focal point of said secondary reflector segment, and said real image is projected along said viewing axis, extending from said object to a surface of said primary reflector segment, to a surface of said secondary reflector segment, to a focal point of said secondary reflector segment, to said visual staging station.

4. The real image projection system of claim 3, wherein a vertex of a parent optic of said secondary reflector segment, from which said shorter focal length reflector segment is derived, is positioned at or very near to a focal point of said longer focal length reflector segment.

5. The real image projection system of claim 3, wherein a vertex of said primary reflector segment is substantially non-coincident with a focal point of said secondary reflector segment, and a vertex of said secondary reflector segment is substantially coincident with a focal point of said primary reflector segment.

6. The real image projection system of claim 3, wherein at least one of said pair of curved reflector segments comprises a coating selected from the group consisting of:
 a) a reflective coating;
 b) a beam splitter coating; and
 c) a partial mirror coating.

7. The real image projection system of claim 6, further comprising an anti-reflective coating applied to a concave surface of at least one of said pair of curved reflectors, when said at least one reflector has a reflective surface on a convex surface thereof.

8. The real image projection system of claim 3, further comprising a lens located between said object and said longer focal length reflector segment, or between said shorter focal length reflector segment and said focal point of said shorter focal length reflector segment.

9. The real image projection system of claim 3, further comprising means for adjusting a position of said object.

10. The real image projection system of claim 3, further comprising means for positioning said curved reflector segments, such that a vertex of said shorter focal length reflector segment is positioned at or very near to a focal point of said longer focal length reflector segment.

11. The real image projection system of claim 3, further comprising a beam-path distance from said object to said longer focal length reflector segment greater than a beam-path distance from said real image to said shorter focal length reflector segment.

12. The real image projection system of claim 3, wherein at least one of said pair of reflector segments comprises a beamsplitter coating or partially reflective mirror coating, and further comprising an object positioned behind and visible through said coated reflector.

13. The real image projection system of claim 12, wherein said object positioned behind and visible through said coated reflector is selected from the group consisting of:
 a) a real object;
 b) a monitor;
 c) a projector or projection screen;
 d) a video image;
 e) a graphic rendering; and
 f) a screen-borne image.

14. The real image projection system of claim 3, further comprising a fold mirror or reflective surface positioned at an angle other than perpendicular to or horizontal to an optical axis of said system, and further comprising means for positioning an input beam-path at an angle other than along said optical axis.

15. The real image projection system of claim 3, further comprising a de-magnified real image that has a greater pixel density per square inch or greater resolution per square inch than that of an actual target object from which said real image is derived.

16. The real image projection system of claim 3, further comprising a de-magnified real image that has brightness or lumens per square inch greater than that of an actual target object from which said real image is derived.

17. The real image projection system of claim 3, wherein a portion of a beam-path between said reflector segments is collimated, and said system projects a de-magnified image.

18. The real image projection system of claim 3, wherein said curved reflector segments are positioned such that their parent optics do not share a common axis, and the axes of said reflector segments are maintained parallel to one another.

19. The real image projection system of claim 3, wherein at least one of said pair of curved reflector segments of unequal focal length is cut to approximately 180 degrees of its parent optic.

20. The real image projection system of claim 2, comprising an object positioned substantially at a focal point of said shorter focal length reflector segment, such that said real image is positioned substantially at said focal point of said longer focal length reflector segment, and an axis of said real image is coincident with said viewing axis, and said real image is projected along a viewing axis extending from said object positioned at said focal point of said secondary reflector segment to a surface of said secondary reflector segment, to a surface of said primary reflector segment, to a focal point of said primary reflector segment, to said visual staging station.

21. The real image projection system of claim 20, further comprising a lens located between said object and said shorter focal length reflector segment, or between said longer focal length reflector segment and said focal point of said longer focal length reflector segment.

22. The real image projection system of claim 20, wherein said curved reflector segments are positioned such that their parent optics do not share a common axis, and the axes of said reflector segments are maintained parallel to one another.

23. The real image projection system of claim 20, wherein at least one of said pair of curved reflector segments of unequal focal length is cut to approximately 180 degrees, or less than 180 degrees, of its parent optic.

24. The real image projection system of claim 1, comprising primary and secondary curved reflector segments of equal focal length.

25. The real image projection system of claim 24, wherein said primary and secondary curved reflector segments are positioned such that a focal point of said primary segment is substantially coincident with a vertex of a secondary parent optic of said secondary segment, from which said secondary reflector segment is derived, and a focal point of said secondary segment is substantially coincident with a vertex of a primary parent optic of said primary segment, from which said primary reflector segment is derived, such that said vertex of said primary parent optic, said vertex of said secondary parent optic, said focal point of said primary parent optic, and said focal point of said secondary parent optic are all located on a common axis or imaginary straight line.

26. The real image projection system of claim 25, comprising an object positioned substantially at a focal point of said primary reflector segment, such that said real image is positioned substantially at said focal point of said secondary reflector segment, and said real image is projected along a viewing axis extending from said object positioned at said focal point of said primary reflector segment to a surface of said primary reflector segment, to a surface of said secondary reflector segment, to a focal point of said secondary reflector segment, to said visual staging station.

27. The real image projection system of claim 26, wherein at least one of said pair of curved reflector segments comprises a coating selected from the group consisting of:
 a) a reflective coating;
 b) a beam splitter coating; and
 c) a partial mirror coating.

28. The real image projection system of claim 27, further comprising an anti-reflective coating applied to a concave surface of at least one of said pair of curved reflectors, when said at least one reflector has a reflective surface on a convex surface thereof.

29. The real image projection system of claim 26, further comprising a lens located between said object and said primary reflector segment, or between said secondary reflector segment and said focal point of said secondary reflector segment.

30. The real image projection system of claim 26, further comprising means for adjusting a position of said object.

31. The real image projection system of claim 26, further comprising means for positioning said curved reflector segments, such that a vertex of said primary reflector segment is positioned at or very near to a focal point of said secondary reflector segment, and a vertex of said secondary reflector segment is positioned at or very near to a focal point of said primary reflector segment.

32. The real image projection system of claim 26, wherein at least one of said pair of reflector segments comprises a beamsplitter coating or partially reflective mirror coating, and further comprising an object positioned behind and visible through said coated reflector.

33. The real image projection system of claim 26, wherein said object positioned behind and visible through said coated reflector is selected from the group consisting of:
 a) a real object;
 b) a monitor;
 c) a projector or projection screen;
 d) a video image;
 e) a graphic rendering; and
 f) a screen-borne image.

34. The real image projection system of claim 26, further comprising a fold mirror or reflective surface positioned at an angle other than perpendicular to or horizontal to an optical axis of said system, and further comprising means for positioning an input beam-path at an angle other than along said optical axis.

35. The real image projection system of claim 26, wherein said curved reflector segments are positioned such that their parent optics do not share a common axis, and the axes of said reflector segments are maintained parallel to one another.

36. The real image projection system of claim 26, wherein at least one of said pair of curved reflector segments of equal focal length is cut to approximately 180 degrees, or less than 180 degrees, of its parent optic.

37. The real image projection system of claim 1, comprising primary and secondary curved reflectors, of equal or unequal focal length, both reflectors being full parent optics cut to a calculated diameter.

38. The real image projection system of claim 37, wherein said reflectors are arranged such that their concave surfaces substantially face one other, and a focal point of each of said reflectors lies on a common axis with a vertex of the other.

39. The real image projection system of claim 37, wherein said reflectors are arranged such that their concave surfaces substantially face one other, with their optical axes offset from and maintained parallel to one another.

40. The real image projection system of claim 37, comprising an object positioned substantially at a focal point of said primary reflector, said primary reflector being positioned above said secondary reflector, and said primary reflector having an aperture consisting of a hole cut at an optical center thereof.

41. The real image projection system of claim 37, wherein said secondary reflector is positioned below said primary reflector and has an aperture consisting of a hole cut in said secondary reflector, thereby providing access to said object or power cords for lighting and turntable motors.

42. The real image projection system of claim 37, further comprising an optical coating or reflective coating on a surface of at least one of said reflectors.

43. The real image projection system of claim 37, further comprising a baffle or black colored disk located about midway between focal points of said reflectors.

44. The real image projection system of claim 37, further comprising means for illuminating said object, without said means being visible to a viewer.

45. The real image projection system of claim 37, wherein said means for illuminating comprises a plurality of white-light, high-output, low-voltage, low-heat, Light Emitting Diodes, mounted onto a circuit board, and wherein a combined cone of projected light is directed therefrom toward said target object.

46. The real image projection system of claim 37, further comprising means for positioning said object at said focal point of said reflector.

47. The real image projection system of claim 46, wherein said means for positioning comprises a turntable.

48. The real image projection system of claim 46, wherein said means for positioning comprises an indexing multi-station turntable for sequential positioning of multiple objects.

49. The real image projection system of claim 37, further comprising a housing.

50. The real image projection system of claim 1, wherein one or more of said optics comprises a curve of the standard conic family on a convex surface thereof, and an aspheric curve on a concave surface thereof.

51. The real image projection system of claim 50, wherein said concave surface of said optic comprises an aspheric surface of revolution, and said aspheric curve is designed to correct and reduce spherical aberrations of an image reflected therefrom.

52. The real image projection system of claim 50, wherein both said concave surface and said convex surface of said optic comprise an aspheric surface of revolution.

53. The real image projection system of claim 50, wherein said convex surface of said optic comprises a coating selected from the group consisting of:
   a) a reflective coating;
   b) a beam splitter coating; and
   c) a partial mirror coating.

54. The real image projection system of claim 50, wherein said concave surface of said optic comprises an anti-reflective coating.

55. The real image projection system of claim 1, further comprising a monitor or projection screen, displaying both a background and a 3D image source on the same screen.

56. The real image projection system of claim 50, further comprising a monitor or projection screen, displaying both a background and a 3D image source on the same screen.

57. The real image projection system of claim 56, wherein both 3D foreground and background image sources are input from a single video signal.

58. The real image projection system of claim 1, wherein the optical curves are formed by any means, including polishing, vacuum forming, holographic fabrication, and injection molding.

59. The real image projection system of claim 50, wherein the optical curves are formed by any means, including polishing, vacuum forming, holographic fabrication, and injection molding.

* * * * *